(12) United States Patent
Ji et al.

(10) Patent No.: US 11,516,754 B2
(45) Date of Patent: Nov. 29, 2022

(54) COMMUNICATION METHOD, COMMUNICATIONS APPARATUS, AND COMMUNICATIONS SYSTEM

(71) Applicant: HUAWEI TECHNOLOGIES CO., LTD., Shenzhen (CN)

(72) Inventors: Liuliu Ji, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 16/765,123

(22) PCT Filed: Nov. 19, 2018

(86) PCT No.: PCT/CN2018/116271
§ 371 (c)(1),
(2) Date: May 18, 2020

(87) PCT Pub. No.: WO2019/096316
PCT Pub. Date: May 23, 2019

(65) Prior Publication Data
US 2020/0351798 A1    Nov. 5, 2020

(30) Foreign Application Priority Data

Nov. 17, 2017  (CN) .......................... 201711148429.5
Feb. 14, 2018  (CN) .......................... 201810152266.6

(51) Int. Cl.
*H04W 52/36*     (2009.01)
*H04L 5/00*      (2006.01)
(Continued)

(52) U.S. Cl.
CPC ......... *H04W 52/365* (2013.01); *H04L 5/0048* (2013.01); *H04W 52/08* (2013.01); *H04W 52/10* (2013.01); *H04W 52/242* (2013.01)

(58) Field of Classification Search
CPC combination set(s) only.
See application file for complete search history.

(56) References Cited

U.S. PATENT DOCUMENTS

2013/0250875 A1    9/2013  Chen et al.
2014/0221038 A1*   8/2014  Nakashima ........... H04L 5/0051
                                                        455/522
(Continued)

FOREIGN PATENT DOCUMENTS

CA       3147011 A1     11/2010
CN       101860943 A    10/2010
(Continued)

OTHER PUBLICATIONS

"3rd Generation Partnership Project; Technical Specification Group Radio Access Network; Evolved Universal Terrestrial Radio Access (E-UTRA); Physical layer procedures (Release 14)," 3GPP TS 36.213 V14.3.0, pp. 1-460, 3rd Generation Partnership Project, Valbonne, France (Jun. 2016).
(Continued)

*Primary Examiner* — Junpeng Chen
(74) *Attorney, Agent, or Firm* — Leydig, Voit & Mayer, Ltd.

(57) ABSTRACT

This application provides a communication method, a communications apparatus, and a communications system. The method includes: receiving first indication information, where the first indication information indicates at least two first parameters, and the at least two first parameters are used for determining at least one of an uplink data channel power, an uplink control channel power, or an uplink reference signal power during dynamic scheduling; and determining a second parameter obtained when a first time element is not used to transmit at least one of an uplink data channel, an uplink control channel, or an uplink reference signal, where the second parameter is at least one of a nominal power, a (Continued)

path loss adjustment factor, a path loss, or a closed-loop power control adjustment value. The method is applicable to power control and/or power headroom reporting in a multi-beam system.

37 Claims, 4 Drawing Sheets

(51) Int. Cl.
*H04W 52/08* (2009.01)
*H04W 52/10* (2009.01)
*H04W 52/24* (2009.01)

(56) References Cited

U.S. PATENT DOCUMENTS

| | | | | |
|---|---|---|---|---|
| 2015/0085787 | A1* | 3/2015 | Ouchi | H04L 5/0094 370/329 |
| 2015/0181539 | A1 | 6/2015 | Aiba et al. | |
| 2015/0358920 | A1 | 12/2015 | Sorrentino et al. | |
| 2016/0112960 | A1 | 4/2016 | Park et al. | |
| 2016/0242128 | A1* | 8/2016 | Loehr | H04W 52/365 |
| 2017/0289921 | A1* | 10/2017 | Kim | H04W 72/0473 |
| 2017/0367056 | A1* | 12/2017 | Wei | H04W 52/325 |
| 2018/0115957 | A1* | 4/2018 | Lin | H04W 52/365 |
| 2018/0132197 | A1* | 5/2018 | Lin | H04W 52/242 |
| 2018/0262998 | A1* | 9/2018 | Park | H04W 52/346 |
| 2020/0383060 | A1* | 12/2020 | Park | H04W 52/42 |

FOREIGN PATENT DOCUMENTS

| | | |
|---|---|---|
| CN | 102752838 A | 10/2012 |
| CN | 103327594 A | 9/2013 |
| CN | 103974319 A | 8/2014 |
| CN | 104322124 A | 1/2015 |
| CN | 104540207 A | 4/2015 |
| EP | 2849517 A1 | 3/2015 |
| JP | 2016021769 A | 2/2016 |
| WO | 2012173570 A1 | 12/2012 |
| WO | 2017135044 A1 | 8/2017 |

OTHER PUBLICATIONS

"3rd Generation Partnership Project; Technical Specification Group Radio Access Network; NR; Physical layer procedures for control (Release 15)," 3GPP TS 38.213 V1.0.0, pp. 1-16, 3rd Generation Partnership Project, Valbonne, France (Sep. 2017).

"3rd Generation Partnership Project; Technical Specification Group Radio Access Network; NR; Medium Access Control (MAC) protocol specification (Release 15)," 3GPP TS 38.321 V1.1.0, pp. 1-64, 3rd Generation Partnership Project, Valbonne, France (Nov. 2017).

"3rd Generation Partnership Project; Technical Specification Group Radio Access Network; NR; Radio Resource Control (RRC); Protocol specification (Release 15)," 3GPP TS 38.331 V0.1.0, pp. 1-42, 3rd Generation Partnership Project, Valbonne, France (Dec. 2017).

Huawei, HiSilicon,"Discussion on PHR calculation," 3GPP TSG RAN WG1 NR Ad Hoc Meeting, Qingdao, China, R1-1710475, Total 4 pages, 3rd Generation Partnership Project, Valbonne, France (Jun. 27-30, 2017).

Asustek, "UL power control in multi-beam based approaches," 3GPP TSG RAN WG1 NR Ad-Hoc#2, Qingdao, P.R. China, R1-1711335, Total 3 pages 3rd Generation Partnership Project, Valbonne, France (Jun. 27-30, 2017).

* cited by examiner

COMMUNICATION METHOD, COMMUNICATIONS APPARATUS, AND COMMUNICATIONS SYSTEM

CROSS-REFERENCE TO RELATED APPLICATIONS

This application is a National Stage of International Patent Application No. PCT/CN2018/116271, filed on Nov. 19, 2018, which claims priority to Chinese Patent Application No. 201810152266.6, filed on Feb. 14, 2018 and Chinese Patent Application No. 201711148429.5, filed on Nov. 17, 2017. All of the afore-mentioned patent applications are hereby incorporated by reference in their entireties.

TECHNICAL FIELD

This application relates to the wireless communications field, and more specifically, to a communication method, a communications apparatus, and a communications system.

BACKGROUND

Massive multiple-input multiple-output (massive multiple-input multiple-output, Massive MIMO) can further improve a system capacity by using more spatial degrees of freedom, and becomes one of key technologies of a new radio (NR) access technology.

In NR, beam-based transmission has become a major focus. Large-scale antenna arrays are configured, so that high-resolution beams can be formed in NR.

How to perform power control or power headroom reporting in NR is an urgent issue to be resolved in current research.

SUMMARY

This application provides a communication method, a communications apparatus, and a communications system, so as to implement power control or power headroom reporting in a multi-beam system.

According to a first aspect, a communication method is provided, including:

receiving first indication information, where the first indication information indicates at least two first parameters, and the at least two first parameters are used for determining at least one of an uplink data channel power, an uplink control channel power, or an uplink reference signal power during dynamic scheduling; and determining a second parameter obtained when a first time element is not used to transmit at least one of an uplink data channel, an uplink control channel, or an uplink reference signal, where the second parameter is at least one of a nominal power, a path loss adjustment factor, a path loss, or a closed-loop power control adjustment value.

In this application, dynamic scheduling may be a scheduling manner in which scheduling information is sent by using a downlink control channel (or downlink control information). In dynamic scheduling, scheduling information may be dynamically generated by a network device, such as a base station, for one transmission occasion. Therefore, a terminal device, such as user equipment (UE) may be notified of scheduling information related to the dynamic scheduling by using a downlink control channel (information). In contrast, in semi-static scheduling, at least a part of scheduling information remains unchanged for a relatively long time, that is, the part of scheduling information may be for a plurality of transmission occasions. Therefore, the UE may be notified of the part of scheduling information less frequently by using, for example, higher layer signaling. The part of scheduling information may include at least one of data resource allocation, a modulation order, a bit rate, or other information. The downlink control information is carried on the downlink control channel. The downlink control information may be used for uplink scheduling (also referred to as an uplink grant), or may be used for downlink scheduling.

Various second parameters in this application include at least one of a nominal power, a path loss adjustment factor, a path loss, or a closed-loop power control adjustment value.

Optionally, the method may further include:

determining at least one of the uplink data channel power, the uplink control channel power, the uplink reference signal power, or power headroom in the first time element based on the second parameter.

Optionally, the first parameter is at least one of a nominal power, a path loss adjustment factor, path loss-related information, or a closed-loop power control indication.

Optionally, the path loss-related information includes at least one of resource information (for example, an SSB or a CSI-RS resource) used for path loss measurement or path loss-related beam information.

Optionally, the closed-loop power control indication is used to indicate information about closed-loop power control, for example, indicate a closed-loop power control process. The information about closed-loop power control may include at least one of a closed-loop power control adjustment value and a closed-loop power control process identifier.

Optionally, the first indication information is indexes of influence factors of the at least two first parameters.

Optionally, the first indication information is carried in higher layer signaling. The higher layer signaling includes RRC signaling and/or a MAC CE.

Optionally, the method may further include:

receiving the at least two first parameters, and/or transmission manners corresponding to the at least two first parameters respectively, and/or transmission configuration information corresponding to the at least two first parameters respectively.

Optionally, the method may further include:

receiving second indication information, where the second indication information indicates a first reference parameter, and the first reference parameter is one of the at least two first parameters; and determining the second parameter based on the second indication information.

Optionally, the second indication information is carried in higher layer signaling.

Optionally, the second indication information is at least one of an index of an influence factor of the first reference parameter, a transmission manner and/or transmission configuration information corresponding to the first reference parameter, or a value of the first reference parameter.

Optionally, the method may further include:

determining the first parameter used in a second time element, where the second time element is different from the first time element; and determining the second parameter based on the first parameter.

Optionally, the second time element may be a time element corresponding to most recent dynamic scheduling before the first time element.

Optionally, the method may further include:

determining that the second parameter is a default value.

Optionally, the uplink data channel is transmitted in the first time element, and the uplink control channel is not transmitted in the first time element; and the method further includes:

determining a power of the uplink control channel in the first time element and power headroom in the first time element based on a first parameter used for determining a power of the uplink data channel transmitted in the first time element; or the uplink control channel is transmitted in the first time element, and the uplink data channel is not transmitted in the first time element; and the method further includes:

determining a power of the uplink data channel in the first time element and power headroom in the first time element based on a first parameter used for determining a power of the uplink control channel transmitted in the first time element.

Optionally, the second parameter is a first type of second parameter, and is one of a nominal power, a path loss adjustment factor, a path loss, or a closed-loop power control adjustment value, and the method further includes:

determining another type of second parameter obtained when the first time element is not used to transmit at least one of the uplink data channel, the uplink control channel, or the uplink reference signal, where the another type of second parameter is one of a nominal power, a path loss adjustment factor, a path loss, or a closed-loop power control adjustment value, and is different from the first type of second parameter; where a transmission manner and/or transmission configuration information corresponding to the first type of second parameter is the same as a transmission manner and/or transmission configuration information corresponding to the second type of second parameter, for example, a corresponding beam information is the same.

Optionally, the transmission manner and/or the transmission configuration information include/includes at least one of beam information, a subcarrier spacing, transmission service information, or a waveform.

Optionally, the method may further include:

determining the second parameter based on the first indication information.

Optionally, the method may further include:

sending indication information of the second parameter to the network device.

According to a second aspect, a communication method is provided, including:

sending first indication information, where the first indication information indicates at least two first parameters, and the at least two first parameters are used for determining at least one of an uplink data channel power, an uplink control channel power, or an uplink reference signal power during dynamic scheduling; and receiving a power headroom report, where the power headroom report is a virtual power headroom report, the virtual power headroom report is related to one of the at least two first parameters, and the first parameter is at least one of a nominal power, a path loss adjustment factor, path loss-related information, or a closed-loop power control indication.

Optionally, the method may further include:

sending second indication information, where the second indication information indicates a first reference parameter, and the first reference parameter is one of the at least two first parameters.

Optionally, the second indication information is carried in higher layer signaling.

Optionally, the second indication information is at least one of an index of an influence factor of the first reference parameter, a transmission manner and/or transmission configuration information corresponding to the first reference parameter, or a value of the first reference parameter.

Optionally, the first indication information is indexes of influence factors of the at least two first parameters.

Optionally, the method may further include:

sending the at least two first parameters, and/or transmission manners corresponding to the at least two first parameters respectively, and/or transmission configuration information corresponding to the at least two first parameters respectively.

According to a third aspect, an apparatus is provided. The apparatus provided in this application has a function of implementing an action of the network device or the terminal device in the aspects of the foregoing methods, and includes corresponding means (means) configured to implement the steps or the functions described in the aspects of the foregoing methods. The steps or the functions may be implemented by using software, hardware, or a combination of the software and the hardware.

In a possible design, the apparatus includes one or more processors and a communications unit. The one or more processors are configured to support the apparatus in performing a corresponding function of the network device in the foregoing method, for example, generating first indication information. The communications unit is configured to support the apparatus in communicating with another device, to implement a receiving function and/or a sending function, for example, sending the first indication information.

Optionally, the apparatus may further include one or more memories. The memory is configured to be coupled to a processor, and the memory stores a program instruction and/or data necessary for a network device. The one or more memories may be integrated with the processor, or may be separate from the processor. This is not limited in this application.

The apparatus may be a base station, a gNB, a TRP, or the like. The communications unit may be a transceiver or a transceiver circuit. Optionally, the transceiver may be an input/output circuit or interface.

The apparatus may alternatively be a communications chip. The communications unit may be an input/output circuit or interface of the communications chip.

In another possible design, the apparatus includes a transceiver, a processor, and a memory. The processor is configured to control the transceiver to send and receive signals. The memory is configured to store a computer program. The processor is configured to run the computer program in the memory, so that the apparatus performs the method completed by the network device in any one of the second aspect or the possible implementations of the second aspect.

In a possible design, the apparatus includes one or more processors and a communications unit. The one or more processors are configured to support the apparatus in performing a corresponding function of the terminal device in the foregoing method, for example, determining a second parameter. The communications unit is configured to support the apparatus in communicating with another device, to implement a receiving function and/or a sending function, for example, receiving first indication information.

Optionally, the apparatus may further include one or more memories. The memory is configured to be coupled to a processor, and the memory stores a program instruction and/or data necessary for the apparatus. The one or more memories may be integrated with the processor, or may be separate from the processor. This is not limited in this application.

The apparatus may be an intelligent terminal, a wearable device, or the like. The communications unit may be a transceiver or a transceiver circuit. Optionally, the transceiver may be an input/output circuit or interface.

The apparatus may alternatively be a communications chip. The communications unit may be an input/output circuit or interface of the communications chip.

In another possible design, the apparatus includes a transceiver, a processor, and a memory. The processor is configured to control the transceiver to send and receive signals. The memory is configured to store a computer program. The processor is configured to run the computer program in the memory, so that the apparatus performs the method completed by the terminal device in any one of the first aspect or the possible implementations of the first aspect.

According to a fourth aspect, a system is provided, where the system includes the foregoing terminal device and network device.

According to a fifth aspect, a computer readable storage medium is provided and is configured to store a computer program. The computer program includes an instruction used to perform the method in any one of the first aspect or the possible implementations of the first aspect.

According to a sixth aspect, a computer readable storage medium is provided and is configured to store a computer program. The computer program includes an instruction used to perform the method in any one of the second aspect or the possible implementations of the second aspect.

According to a seventh aspect, a computer program product is provided, where the computer program product includes computer program code, and when the computer program code is run on a computer, the computer is enabled to perform the method in any one of the first aspect or the possible implementations of the first aspect.

According to an eighth aspect, a computer program product is provided, where the computer program product includes computer program code, and when the computer program code is run on a computer, the computer is enabled to perform the method in any one of the second aspect or the possible implementations of the second aspect.

According to the method provided in the embodiments of this application, a power and/or power headroom determining method in a multi-beam scenario can be provided, and is applicable to power control or power headroom reporting in a multi-beam scenario, for example, is applicable to power control or power headroom reporting in an NR system.

DESCRIPTION OF EMBODIMENTS

Figure 1:
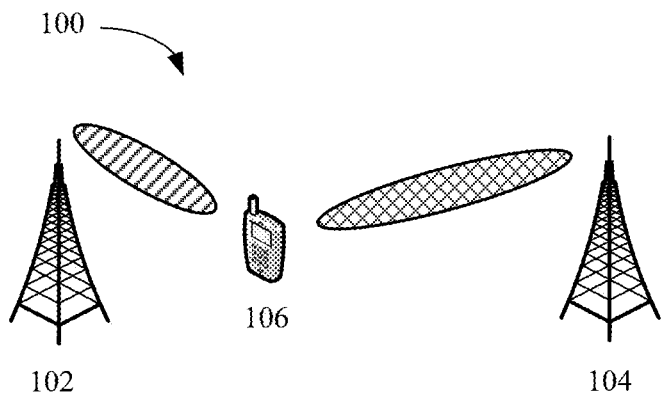
FIG. 1 is a schematic diagram of a communications system to which a communication method in the embodiments of this application is applicable.

The following describes technical solutions of this application with reference to accompanying drawings.

The technical solutions in the embodiments of this application may be applied to various communications systems, for example, a long term evolution (LTE) system, a worldwide interoperability for microwave access (WiMAX) communications system, a future 5th generation (5G) system such as a new radio access technology (NR), and a future communications system such as a 6G system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in the embodiments of this application is used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

In the embodiments of this application, one of information, signal, message, or channel may be used sometimes. It should be noted that expressed meanings are consistent when differences are not emphasized. "Of", "relevant", and "corresponding" may be interchangeably used sometimes. It should be noted that expressed meanings are consistent when differences are not emphasized.

In the embodiments of this application, sometimes a word, such as $W_1$, including a subscript may be written in an incorrect form such as W1. Expressed meanings are consistent when differences are not emphasized.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

The embodiments of this application may be applied to a time division duplex (TDD) scenario, or may be applied to a frequency division duplex (FDD) scenario.

The embodiments of this application may be applied to a conventional typical network, or may be applied to a future UE-centric network. A non-cell network architecture is introduced to the UE-centric network. To be specific, a large quantity of small cells are deployed in a specific area to form a hyper cell, and each small cell is a transmission point (TP) or a TRP of the hyper cell, and is connected to a centralized controller. When UE moves in the hyper cell, a network side device selects, in real time, a new sub-cluster for the UE to serve the UE, so as to avoid real cell handover and implement service continuity of the UE. The network side device includes a wireless network device.

In the embodiments of this application, different base stations may be base stations that have different identifiers, or may be base stations that have a same identifier and are deployed in different geographical locations. Before a base station is deployed, the base station does not know whether the base station is involved in a scenario used in the embodiments of this application. Therefore, a base station or a baseband chip needs to support the method provided in the embodiments of this application before being deployed. It may be understood that the foregoing different identifiers of the base stations may be base station identifiers, cell identifiers, or other identifiers.

In the embodiments of this application, a scenario of an NR network in a wireless communications network is used as an example for description. It should be noted that the solutions in the embodiments of this application may also be applied to another wireless communications network, and a corresponding name may also be replaced with a name of a corresponding function in another wireless communications network.

In the embodiments of this application, a beam may be understood as a spatial resource, and may be a transmit or receive precoding vector having energy transmission directivity. In addition, the transmit or receive precoding vector can be identified by using index information. The energy transmission directivity may mean that a signal on which precoding processing is performed by using the precoding vector and that is received in a spatial position has a relatively good receive power, for example, satisfies a receive demodulation signal-to-noise ratio. The energy transmission directivity may also mean that same signals transmitted from different spatial positions and received by using the precoding vector have different receive powers.

Optionally, one communications device (such as a terminal device or a network device) may have different precoding vectors, and different devices may also have different precoding vectors, that is, correspond to different beams.

With respect to a configuration or capability of the communications device, the communications device may use one or more of different precoding vectors at a same time, that is, one or more beams may be formed at the same time. Beam information may be identified by using index information. Optionally, the index information may correspond to a resource identity (ID) configured for UE. For example, the index information may correspond to a configured ID or resource of a channel state information reference signal (CSI-RS), or may correspond to a configured ID or resource of an uplink sounding reference signal (SRS). Alternatively, optionally, the index information may be index information explicitly or implicitly carried by a signal or a channel carried on a beam. For example, the index information may be index information of the beam, indicated by a synchronization signal or a broadcast channel transmitted by using the beam.

For ease of understanding the embodiments of this application, first a communications system shown in FIG. 1 is used as an example to describe in detail a communications system to which the embodiments of this application is applicable. FIG. 1 is a schematic diagram of a communications system to which a communication method in the embodiments of this application is applicable. As shown in FIG. 1, the communications system 100 includes a network device 102 and a terminal device 106. The network device 102 may be configured with a plurality of antennas, and the terminal device may also be configured with a plurality of antennas. Optionally, the communications system may further include a network device 104. The network device 104 may also be configured with a plurality of antennas.

It should be understood that the network device 102 or the network device 104 may further include a plurality of components related to signal sending and receiving (e.g., a processor, a modulator, a multiplexer, a demodulator, or a demultiplexer).

The network device is a device that has a wireless transceiver function or a chip that can be disposed in the device. The device includes but is not limited to: an evolved NodeB (evolved Node B, eNB), a radio network controller (RNC), a NodeB (Node B, NB), a base station controller (BSC), a base transceiver station (BTS), a home base station (e.g., home evolved NodeB or home Node B, HNB), a baseband unit (BBU), an access point (AP) in a wireless fidelity (Wi-Fi) system, a wireless relay node, a wireless backhaul node, a transmission point (transmission and reception point, TRP; or transmission point, TP), and the like; or may be a gNB or a transmission point (TRP or TP) in a 5G system such as an NR system, one or one group of antenna panels (including a plurality of antenna panels) of a base station in a 5G system, or a network node forming a gNB or a transmission point, such as a baseband unit (BBU) or a distributed unit (DU).

In some deployment, the gNB may include a centralized unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer finally becomes information at the PHY layer, or is converted from information at the PHY layer. Therefore, in this architecture, higher layer signaling such as RRC layer signaling or PHCP layer signaling may also be considered as being sent by the DU, or being sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device in the embodiments of this application may be a mobile phone, a tablet computer (Pad), a computer with a wireless sending/receiving function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. In this application, the foregoing terminal device and a chip that can be disposed in the foregoing terminal device are collectively referred to as a terminal device.

In the communications system 100, both the network device 102 and the network device 104 may communicate with a plurality of terminal devices (such as the terminal device 106 shown in the figure). The network device 102 and the network device 104 may communicate with any quantity of terminal devices similar to the terminal device 106. However, it should be understood that a terminal device that communicates with the network device 102 and a terminal device that communicates with the network device 104 may be the same or may be different. The terminal device 106 shown in FIG. 1 may communicate with the network device 102 and the network device 104 at the same time. However, this shows only one possible scenario. In some scenarios, the terminal device may communicate with only the network device 102 or the network device 104. This is not limited in this application.

It should be understood that, FIG. 1 is only a simplified schematic diagram used as an example for ease of understanding. The communications system may further include another network device or may further include another terminal device, which is not drawn in FIG. 1.

To improve system performance, link adaptation, power control, and the like are usually important management functions in a communications system. In a communications network, at least one node sends a signal to another node, and a purpose of power control is to enable, in a network, a power of the signal sent by the at least one node to meet a system requirement when the signal arrives at the another node.

The node herein may be a base station, user equipment, or the like. For example, power control may enable a power of a signal sent by a user to meet a specific power requirement when the signal arrives at another user. Alternatively, for example, power control may enable a power of a signal sent by a user to meet a power requirement of a base station when the signal arrives at the base station. Alternatively, for example, power control may enable a signal sent by a base station to meet a power requirement of user equipment when the signal arrives at the user equipment.

A power requirement in power control may be a power requirement of a node. For example, if a signal is a wanted signal for the node, the node requires a power of the received signal to meet a demodulation threshold requirement. The requirement is that the power of the received signal should not be extremely low. If the power of the received signal is extremely low, the signal cannot be correctly received or demodulated. Alternatively, for example, if the signal is an unwanted signal for the node, such as an interference signal, the node requires the power of the received signal to meet an interference threshold requirement. The requirement is that the power of the received signal should not be extremely high. If the power of the received signal is extremely high, the signal causes strong interference to a wanted signal of the node.

Power control may occur between one node and another node. For example, in a D2D scenario, power control is to enable a power of a signal from one user equipment to another user equipment to meet a specific SINR. Alternatively, power control may occur between a plurality of nodes and one node. For example, in LTE uplink, power control is to enable a power from at least one user equipment in a network to a base station to meet a signal to interference plus noise ratio SINR requirement of the base station. Alternatively, power control may occur between a plurality of nodes and a plurality of nodes. For example, in a TDD network standard, both uplink and downlink scheduling may exist in a system (e.g., a dynamic TDD technology in a 5G network), and in this case, power control may be used to satisfy many-to-many power requirements between a plurality of user equipments and a plurality of base stations in a network.

Power control is designed to control a signal transmit power of a node in a network, so that a received power of the signal meets a receiving requirement. Herein, the receiving requirement may be the power requirement, the SINR requirement, or the like described above, or a signal-to-noise ratio SNR requirement. An SNR, an SINR, IoT (interference over thermal), an RSRP (reference signal received power), and a received power of a signal may be all considered as target parameters in a power control phase. These parameters are not completely equivalent, but are interrelated. For example, the SINR and the RSRP are not completely equal, but in a case of a same interference level, a higher RSRP indicates a better SINR of a signal. Power control in this specification is not limited to a target control parameter of an actual algorithm. However, generally, the base station may determine a power control parameter by determining, through comparing, whether a statistical signal SINR converges to a target SINR.

A power headroom (PH) report PHR is also a part in a power control phase. Power control headroom is a power difference between a maximum transmit power that can be reached by a node and a power at which the node sends a signal. The power difference herein is a difference between powers in a broad sense, and does not necessarily mean a value obtained by subtracting one power from another power. Actually, the power difference may be obtained by subtracting a linear value of a signal transmit power from a linear value of the maximum power; or the power difference may be obtained by subtracting a decibel (dB) value of the signal transmit power from a decibel (dB) value of the maximum power, which is equivalent to dividing the linear value of the maximum power by the linear value of the signal transmit power to obtain a result and then converting the result into a dB value. This is also referred to as a power difference. Accordingly, a description of a formula in this application is intended to describe a physical meaning of a power difference, and the formula itself may also be transformed among subtraction of dB values, division of linear values, subtraction of linear values, and the like.

A PH value may be a positive number, 0, or a negative number. The value may be quantized. For example, the PH value is quantized to different quantization levels based on a specific quantization interval.

The power headroom report is sent to another node by the foregoing node that sends the signal. For example, in an LTE network, user equipment calculates, generates, and sends a PHR, and a base station receives, calculates, and applies a PH value. In LTE, when a trigger condition is met, the user equipment triggers a PHR, and when a reporting condition is met, the UE obtains a PH value, delivers the PH value to an information element corresponding to the PHR, and then sends the PHR by using a carrying channel. In LTE, the PHR information element is a MAC information element, and the carrying channel is a PUSCH.

After receiving the PHR, the base station may obtain PH information and the like in the PHR. The base station may use the PH information to perform a power management process. For example, when the PH value of the user equipment received by the base station is relatively small (when the PH value is a negative number, the PH value may also be described as a relatively small PH value), it means that a maximum transmit power that can be supported by the user equipment is difficult to or cannot be used to send a current signal. In this case, the base station may adjust, by using an algorithm, a resource allocated to the user equipment, for example, reduce bandwidth of sending a signal by the user equipment, or the base station may adjust a transmit power of the user equipment, for example, reduce a transmit signal power of the user equipment (a specific method is described in the following embodiment), so that the user equipment can send a signal, avoiding a decline in signal quality caused when actual transmit power density is lower than power density required by the base station due to an excessive transmit power requirement and an insufficient maximum power of the user equipment. This is an example in which a PH is applied in power control. In an actual system, various optimization algorithms can be designed based on a physical meaning of PH to optimize system performance.

The foregoing physical process of the PHR is not limited to the LTE network. The process may also be extended, reduced, or embedded in another network, such as a 5G network.

To simplify the following descriptions, power control is referred to as PC, and a power headroom reporting process is referred to as PHR. In a broad sense, both PC and a PHR are some of processes in power control. PC is mainly used to directly control a transmit power of a terminal device, and a PHR is used to indirectly control a transmit power, a resource, and the like of a terminal device.

Related formulas in power control and power headroom reporting are designed for various uplink signals and channels. In LTE, the formulas are targeted for a PUSCH, a PUCCH, and an SRS. In 5G, the formulas are correspondingly targeted for an uplink data channel, a control channel, a reference signal used for demodulation, a reference signal used for channel measurement, a random access channel, and the like. A resource granularity calculated by using a related formula is a resource set, and the resource set includes at least one minimum resource granularity. In time domain, the resource set may be a system frame, a radio frame, a frame, a subframe, a slot, a half slot, a mini slot, a symbol, a symbol set, or the like. In frequency domain, the resource set may be a carrier, system bandwidth, a part of bandwidth, a bandwidth part, a subband, a resource block, a subcarrier, a serving cell, or the like. Generally, a granularity in a formula may be a scheduling granularity of a channel or a signal.

In a modem communications system, a multi-antenna technology is widely used in networks such as LTE, 5G NR, and Wi-Fi, and a node sends or receives a signal by using a plurality of antennas. This is referred to as MIMO. In a MIMO system, a node can adjust a MIMO transmit and receive scheme, for example, adjust a weight of a transmit antenna and allocate different signals to different antennas, to obtain gains such as diversity and multiplexing gains, improve a system capacity, and enhance system reliability. With development of the MIMO technology and application of massive MIMO (MMIMO), system performance can be further improved. In a high frequency band, a wavelength of a signal is relatively short, for example, only at a millimeter level, and a corresponding antenna size is also reduced. In this way, a node in a network can be configured with a large-scale antenna array. In M-MIMO, the node can be configured with dozens of, hundreds of, or even more antenna elements. These antenna elements can form an antenna array according to a specific arrangement, for example, a linear arrangement or a circular arrangement. When the node sends or receives a signal by using the antenna array, the node may adjust a weight of an antenna element to obtain an antenna gain, so that the signal sent or received presents uneven energy distribution in space. By using some algorithms, a signal may have energy concentrated in some directions in space. This effect may be referred to as beamforming. In this case, the signal forms a beam in space. The space herein may be angle distribution in a horizontal direction, angle distribution in a vertical direction, or the like.

In a high frequency, because of this M-MIMO technology, an antenna gain is usually high, so that a signal has obvious beam directivity. Different beams are highly isolated, and the beams will experience different channel statuses. When two nodes communicate with each other by using a beam, if other conditions remain unchanged, different beams may cause a large change in a received power, which varies from a few dB to a dozen dB. In an LTE power control technology, this beam status is not considered.

In a communications system, a plurality of power control parameters may be flexibly used for power calculation. This ensures that in different scenarios, the terminal device can perform calculation based on different parameters to meet requirements of these different scenarios.

For example, a network device and a terminal device may perform transmission by using a beam. A beam is a physical resource. In some communications systems, the beam may be indexed as a pilot resource, a time-frequency resource, or the like.

A physical meaning of a beam is as follows: A signal may be transmitted or received by using a multi-antenna technology, and a transmission node, such as a network device or a terminal device, may perform weight processing on a plurality of antennas, so that a transmitted or received signal presents uneven distribution of energy in a specific spatial direction, and signal energy is aggregated. This energy aggregation may be referred to as a beam.

In a beam transmission process, beam switching may be performed between the network device and the terminal device, and in particular, when quality of a beam deteriorates, another beam may be used to perform communication, so as to ensure communication quality.

In view of this, a plurality of PLs may be introduced in a multi-beam system. In this way, the terminal device may measure a PL based on a plurality of pilots, which is written as PL(k), where k herein is a value corresponding to a measurement resource. The measurement resource is corresponding to a beam. The network device usually notifies the terminal device of a used beam in a transmission process, and the beam may include a transmit beam, a receive beam, and the like. Therefore, when receiving indication information of the beam, the terminal device may clearly know what measurement resource should be used for measurement currently, and then calculate a power. However, when the terminal device does not receive the beam indication, how the terminal device obtains PL(k) for calculating a power or power headroom from a plurality of PL(k) is an urgent problem to be resolved.

Figure 2:
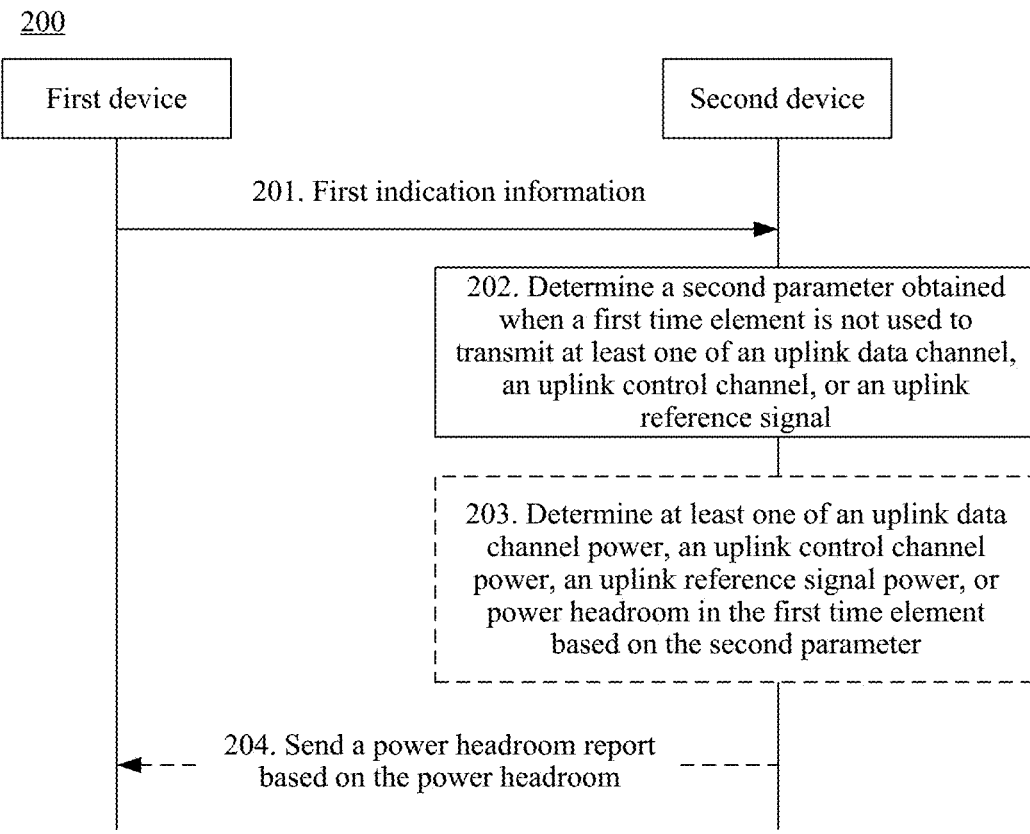
FIG. 2 is a schematic flowchart of a communication method according to an embodiment of this application.

As shown in FIG. 2, an embodiment of this application provides a communication method, for power control or power headroom reporting in an NR system. This embodiment of this application may be applied to communication between network devices (e.g., between a macro base station and a micro base station), between a network device and a terminal device, and between terminal devices (e.g., device-to-device D2D or vehicle-mounted device to another device V2X communication). Communication between a network device and a terminal device is used as an example for description herein, but this embodiment is not limited thereto. For example, the foregoing several kinds of communication may be collectively referred to as communication between a transmit end and a receive end. In this application, "uplink" may indicate that the terminal device is a transmit end and the network device is a receive end, and "downlink" may indicate that the network device is a transmit end and the terminal device is a receive end. When this application is applied to communication between a transmit end and a receive end, "uplink" may indicate a transmission direction, and "downlink" may indicate another transmission direction opposite to the uplink direction.

The communication method 200 may include the following steps:

Step S201: Receive first indication information, where the first indication information indicates at least two first parameters, and the at least two first parameters are used for determining at least one of an uplink data channel power, an uplink control channel power, or an uplink reference signal power during dynamic scheduling.

Step S202: Determine a second parameter obtained when a first time element is not used to transmit at least one of an uplink data channel, an uplink control channel, or an uplink reference signal, where the second parameter is at least one of a nominal power, a path loss adjustment factor, a path loss, or a closed-loop power control adjustment value.

Optionally, in step S203, at least one of the uplink data channel power, the uplink control channel power, the uplink reference signal power, or power headroom in the first time element is determined based on the second parameter.

Optionally, in step S204, a power headroom report is sent based on the power headroom.

Optionally, maximum transmit power information and/or information about the determined (or selected) second parameter may be further sent.

In a communications system, power control may be performed on one or more channels, or a power/powers of one or more channels is/are considered during power headroom reporting.

The one or more channels may include at least one of a data channel, a control channel, or a reference signal.

An uplink data channel such as a physical uplink shared channel (PUSCH), an uplink control channel such as a physical uplink control channel (PUCCH), and an uplink reference signal such as a sounding reference signal (SRS) are used as an example for description in this application.

When a power is described, one time element (a granularity of one time element may be referred to as a time unit) may be used as a granularity for description. The time unit is used to represent a time element in time domain, and may be, for example, one or more of a sampling point, a symbol, a mini slot, a slot, a subframe, or a radio frame. Time unit information may include a type, a length, a structure, or the like of a time unit. Optionally, a time unit may be understood as a time domain unit for resource scheduling.

When power is described, one or more of the following parameters may be involved: $P_{CMAX}$, $M_{PUSCH}$, $P_O$, $\alpha$, PL, $\Delta_{TF}$, and f. These parameters are also mentioned in the power control part 36.213 of the LTE protocol. In NR, meanings of these parameters are similar.

$P_{CMAX}$ represents a dB value of a maximum transmit power configured for the terminal device.

$M_{PUSCH}$ represents bandwidth of a data channel, such as a PUSCH.

$P_o$ represents reference power density, which may also be referred to as a nominal power and physically means power density of a signal expected to be received by a receive end, where the power density is power density in frequency domain.

$\alpha$ a represents a path loss compensation factor.

Optionally, a value of $\alpha$ is a discrete value between [0, 1], for example, $\alpha \in \{0, 0.4, 0.5, 0.6, 0.7, 0.8, 0.9, 1\}$. This parameter is used to adjust path loss compensation, and therefore the parameter is usually presented as a multiplication coefficient of a path loss PL. The network device may use this parameter to control a degree to which a terminal device compensates for a path loss. For example, a center terminal device usually has a relatively good channel condition, and the network device may configure $\alpha$ less than 1 for the center terminal device, so as to suppress interference from the center terminal device to an edge terminal device.

PL represents a path loss, and is used to compensate for a path loss in signal transmission. Optionally, the path loss may be considered as a path loss in a broad sense, may be understood as a path loss, a coupling loss, or the like, and represents a large-scale loss experienced when a signal is transmitted on a link between a network device and a terminal device. For example, in an LTE system, a terminal device receives a CRS cell reference signal, measures a receive power of the CRS, and subtracts a receive power obtained after higher layer filtering from a network device side transmit power configured by a network device for the terminal device, to obtain PL (PL=referenceSignalPower− higher layer filtered RSRP).

$\Delta_{TF}$ represents a power offset value related to a modulation and coding scheme and content of a signal (e.g., whether there is uplink control information UCI or a size of uplink control information). Optionally, when a terminal device performs transmission at a high bit rate, a value of $\Delta_{TF}$ is correspondingly larger, so as to improve a transmit power, ensure signal quality during the high bit rate transmission, and avoid a decline in demodulation performance of a signal due to the high bit rate transmission.

f, h, and g represent closed-loop power control adjustment values of a data channel, a reference signal, and a control channel respectively, and optionally, may be dynamic power offsets indicated by a transmission power control TPC command.

$\Delta_F$ represents a format offset of a control channel, such as a PUCCH.

The foregoing parameters may be further limited by using a subscript, an influence factor (also referred to as a variable), or the like, and are applied to a specific channel, for example, one or more of an uplink data channel, an uplink control channel, or an uplink reference signal.

For example, to determine a power of a PUSCH, the foregoing parameters may be in the following equation:

$$P_{PUSCH,c}(i) = \min \begin{cases} P_{CMAX,c}(i), \\ 10\log_{10}(M_{PUSCH,c}(i)) + P_{o,c}(j) + \alpha_c(j) \cdot PL_c(k) + \Delta_{TF,c}(i) + f_c(i, l) \end{cases}$$

In the foregoing formula, meanings of influence factors or subscripts may be as follows:

PUSCH indicates that the parameter is a PUSCH-related parameter. Similarly, PUCCH indicates that the parameter is a PUCCH-related parameter, and SRS indicates that the parameter is an SRS-related parameter.

For example, $M_{PUSCH}$ represents bandwidth of a PUSCH.

i is an identifier (also referred to as an index or a sequence number) of a time element, such as a slot.

c is a carrier identifier (or sequence number or index), or a serving cell number (or identifier or index).

For example, $M_{PUSCH,c}(i)$ represents bandwidth of a PUSCH sent on a carrier c in a subframe i.

If c in this application represents a serving cell, it means that a power, power headroom, and the like in this application are calculated for a serving cell. If c represents a carrier identifier, it means that a power, power headroom, and the like in this application are calculated for a carrier identifier.

In this application, there may be one or more subscripts in a parameter. For example, in addition to a subscript c in a parameter, a subscript u may be added, which indicates that the parameter is for a carrier of a serving cell. For example, Pcmax may have subscripts c and u, and this indicates that Pcmax is for a carrier u of a serving cell c.

In this application, one or more uplink carriers may exist in a serving cell, and the carriers may be distinguished by using carrier identifiers IDs or radio network temporary identifiers (RNTI).

j, b, and m respectively represent identifiers (also referred to as indexes, sequence numbers, or values) of transmission manner-related parameters of a PUSCH, a PUCCH, and an SRS.

In this application, a transmission manner includes one or more of dynamic scheduling transmission, semi-static scheduling transmission, non-grant-information-based transmission, or an access procedure. There may be a plurality of transmission configurations for these transmission manners. The transmission configuration in this application includes at least one of a transmission beam, a transmission waveform (such as CP-OFDM or DFT-S-OFDM), a transmission service (such as URLLC or eMBB), numerology, a bandwidth part BWP, a carrier, a time domain length, a slot set, and the like.

For example, different values of j, b, and m may represent different transmission manners or transmission configurations. For example, j=0 corresponds to a semi-static scheduling manner, j=1 corresponds to a dynamic scheduling manner, and j=2 corresponds to a random access procedure.

In this application, a beam may be identified by using one or more of a resource identifier ID, a port number, a time domain identifier, a frequency domain identifier, a pattern identifier, and a precoding matrix identifier of a signal.

The numerology in this application is a parameter used in a 5G communications system. The numerology may be defined by using one or more of the following parameter information: a subcarrier spacing, a cyclic prefix (CP), a time unit, and bandwidth. For example, the numerology may be defined by using a subcarrier spacing and a CP. CP information may include a CP length and/or a CP type. The CP type may be determined based on a CP overhead. For example, the CP may be a normal CP (NCP) or an extended CP (ECP). For another example, the numerology corresponds to a subcarrier spacing in frequency domain. Different numerology may be defined by scaling up or down a reference subcarrier spacing by N times. Optionally, N is an integer.

k has a correspondence with a resource of a reference signal (RS) for measuring a path loss.

k represents a resource of a reference signal (RS) for measuring a path loss related to PUSCH power determining, $k_1$ represents a resource of a reference signal (RS) for measuring a path loss related to PUCCH power determining, and $k_2$ represents a resource of a reference signal (RS) for measuring a path loss related to PUCCH power determining.

l corresponds to a closed-loop power control (power control for short) number (also referred to as a closed-loop power control process indication or index or identifier).

The foregoing subscript may also have a subscript, for example, a numeric subscript: 0, 1, 2, . . . , or the like, so as to distinguish between different values, for example, $k_1$, $k_2$, $l_1$, and $l_2$.

In this application, use of a numeric subscript may not be strict, and is not a concern for a value of an influence factor of a corresponding parameter in the formula of this application or a value of a corresponding parameter unless otherwise specified. When values of influence factors of corresponding parameters or values of corresponding parameters are different, the parameters in a formula may be distinguished by using a numeric subscript.

In this application, a superscript ^ represents a linear value, for example, $\hat{P}_{PUCCH}(i)$ represents a linear value of a power allocated to a PUCCH in a time element i.

There may be a plurality of combinations of the foregoing one or more channels during transmission, for example, one or more of the data channel, the control channel, and the reference signal is/are sent. When powers and power headroom of these channels are being determined, there are many cases. The following separately describes these cases.

(1) Data Channel Power Determining

The power of the data channel may be determined in the following three cases:

(1.1) There is a PUSCH Transmitted in a Time Element, Such as a Slot i, but there is No PUCCH Transmitted.

The terminal device obtains corresponding power control parameters based on a current transmission configuration, and calculates a power of the PUSCH based on the power control parameters.

Optionally, the power of the PUSCH may be calculated based on a formula, a table, a sequence, or another representation form satisfying the following equation:

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

The corresponding power control parameters may include $P_{CMAX}$, $M_{PUSCH}$, $P_O$, $\alpha$, PL, $\Delta_{TF}$, and f in the foregoing equation (for ease of description, influence factors or subscripts such as c, i, and j of these parameters are omitted herein).

In a possible implementation, the network device may send configuration information to the terminal device, where the configuration information indicates at least two first parameters, and the at least two first parameters are candidates for power control parameters used by the terminal device to determine the power of the uplink data channel.

Optionally, the at least two first parameters are used to determine a power of the uplink data channel during dynamic scheduling.

Optionally, the first parameter may be at least one of a nominal power (which is a nominal power of the uplink data channel), a path loss adjustment factor, path loss measurement-related information (e.g., resource information used for path loss measurement), or a closed-loop power control indication (e.g., a closed-loop power control process indication and/or a closed-loop power adjustment value).

It may be understood that power control parameters configured by the network device for the terminal device may be a first parameter set, and the set includes one or more of the foregoing nominal power (which is the nominal power of the uplink data channel), path loss adjustment factor, path loss measurement-related information, or closed-loop power control indication.

Optionally, the first parameter is carried by using higher layer signaling.

Optionally, the higher layer signaling may be radio resource control RRC signaling or a media access control control element MAC CE.

Further, the network device may send indication information to the terminal device, where the indication information is used to instruct to use one of the at least two first parameters in the time element i.

Optionally, the indication information is carried by using downlink control information, such as downlink control information DCI.

Optionally, the downlink control information may further carry information used to schedule the PUSCH. The information used to schedule the PUSCH may instruct to transmit the PUSCH in the time element i, and may be further used to indicate resource information of the PUSCH, such as bandwidth of the PUSCH.

In this way, based on the foregoing first parameters and downlink control information, the terminal device can obtain the power of the uplink data channel in the time element i. Optionally, the terminal device may obtain the power of the uplink data channel in the time element i based on the foregoing equation.

(1.2) There are a PUSCH and a PUCCH Transmitted in the Time Element i.

The terminal device obtains corresponding power control parameters based on a current transmission configuration, and calculates a power of the PUSCH based on the power control parameters.

Optionally, the power of the PUSCH may be calculated based on a formula, a table, a sequence, or another representation form satisfying the following equation.

When calculating the power of the PUSCH, if the PUCCH and the PUSCH are simultaneously transmitted, the terminal device may first ensure transmission of the PUCCH. Therefore, a power of the PUCCH may be preferentially allocated. Then, when the power of the PUSCH is being calculated, it is ensured that an upper limit of the power does not exceed a value obtained after the power of the PUCCH that is simultaneously transmitted is subtracted from a maximum power.

$$P_{PUSCH,c}(i) = \min\begin{Bmatrix} 10\log_{10}(\hat{P}_{CMAX}(i) - \hat{P}_{PUCCH}(i)), \\ 10\log_{10}(M_{PUSCH,c}(i)) + P_{O\_PUSCH,c}(j) + \\ \alpha_c(j) \cdot PL_c(k) + \Delta_{TF,c}(i) + f_c(i,l) \end{Bmatrix}$$

The corresponding power control parameters may include $\hat{P}_{CMAX}$, $\hat{P}_{PUCCH}$, $M_{PUSCH}$, $P_O$, $\alpha$, $PL$, $\Delta_{TF}$, and f in the foregoing equation (for ease of description, influence factors or subscripts such as c, i, and j of these parameters are omitted herein).

Similarly, referring to the description in the foregoing possible implementation 1 in 1.1, the terminal device may obtain the power of the uplink data channel in the time element i based on the foregoing first parameter and the downlink control information and based on obtaining of the power of the PUCCH in (2). Optionally, the terminal device may obtain the power of the uplink data channel in the time element i based on the foregoing equation.

(1.3) There is No PUSCH Transmitted in the Time Element i, and a Power of a PUSCH May be Determined in a Case of Closed-Loop Power Control and Transmission Power Control (TPC) Accumulation.

When the terminal device currently does not transmit the PUSCH but still receives a TPC command, to ensure that TPC accumulation does not exceed an upper limit and a lower limit, the power of the PUSCH also needs to be calculated, where the upper limit is generally a maximum transmit power, and the lower limit is generally 0.

In this case, the time element i is not used to transmit the PUSCH, that is, there is no scheduling information of the PUSCH.

In a possible implementation, the terminal device determines a second parameter. The second parameter is at least one of a nominal power (which is a nominal power of the PUSCH), a path loss adjustment factor, a path loss, or a closed-loop power control adjustment value.

Further, the terminal device may calculate the power of the PUSCH based on the second parameter.

Optionally, the power of the PUSCH is calculated based on a formula, a table, a sequence, or another representation form satisfying the following equation:

$$P_{PUSCH,c}(i) = \min\begin{Bmatrix} P_{CMAX,c}(i), \\ P_{O\_PUSCH,c}(j) + \alpha_c(j) \cdot PL_c(k) + f_c(i,l) \end{Bmatrix}$$

For a method of determining the second parameter used for power control, refer to specific description in the following. Details are not described herein.

(2) Control Channel Power Determining

The power of the control channel may be determined in the following three cases:

(2.1) There is a PUCCH Transmitted in a Time Element i.

The terminal device obtains corresponding power control parameters based on a current transmission configuration, and calculates a power of the PUCCH based on the power control parameters.

Optionally, the power of the PUCCH may be calculated based on a formula, a table, a sequence, or another representation form satisfying the following equation:

$$P_{PUCCH,c}(i) = \min\begin{Bmatrix} P_{CMAX,c}(i), \\ P_{O\_PUCCH,c}(b) + PL_c(k_1) + 10\log_{10}(M_{PUCCH,c}(i)) + \\ \Delta_{F\_PUCCH,c}(F) + \Delta_{PUCCH\_TF,c}(i) + g_c(i,l) \end{Bmatrix}$$

In the foregoing equation, a subscript with "PUCCH" indicates that the parameter is corresponding to the PUCCH, for example, $M_{PUCCH}$ represents bandwidth of the PUCCH. $P_{O\_PUCCH,c}(b)$ represents a nominal power of the PUCCH, and is a variation of $P_o$, where b is a physical parameter similar to j in (1.3), and is related to a transmission configuration. For the PUCCH, the network device may configure a total of B nominal powers for the terminal device, and it indicates that b corresponds to one of the nominal powers. $PL_c(k_1)$ represents a path loss of the PUCCH that is measured by the terminal device by using a corresponding measurement resource $k_1$. $k_1$ and k may be the same or different. If they are the same, it indicates that path losses of the PUSCH and the PUCCH are obtained by using same measurement resources; if they are different, it indicates that path losses of the PUSCH and the PUCCH are obtained by using different measurement resources, and in this case, the terminal device may send the PUSCH and the PUCCH by using different beams. $\Delta_{F\_PUCCH}(F)$ is a power offset of a format of the PUCCH, where F corresponds to the format of the PUCCH. $\Delta_{PUCCH\_TF,c}(i)$ is a parameter related to a modulation and coding scheme of the PUCCH, and is a variation of the foregoing $\Delta_{TF}$. A function (or expression) of g is similar to that of f in (1.1), and g is a closed-loop power control parameter for the PUCCH. In this application, a closed-loop power control process of the PUCCH may be the same as or different from that of the PUSCH, and whether the closed-loop power control process of the PUCCH is the same of the PUSCH (even if both use a parameter 1) is not limited for a formula in this application. It may be understood that a subscript, such as a subscript 1, may be added to the parameter 1 to distinguish between the closed-loop power control process of the PUCCH and the closed-loop power control process of the PUSCH.

Because a priority of the PUCCH is higher than that of other information, when the power of the PUCCH is being determined, whether another signal is transmitted may not be considered.

If the parameters of the PUCCH are not related to c, the subscripts of the PUCCH-related parameters in the foregoing formula may be removed. For example, if the PUCCH is sent only in a primary serving cell, the parameters of the PUCCH are related to the primary serving cell. In this case, c does not need to be distinguished, and c can be removed.

For the obtaining, by the terminal device, corresponding power control parameters based on a current transmission configuration:

In a possible implementation, the network device may send configuration information to the terminal device, where the configuration information indicates at least two first parameters, and the at least two first parameters are candidates for power control parameters used by the terminal device to determine the uplink control channel.

Optionally, the at least two first parameters are used to determine a power of the uplink data channel during dynamic scheduling.

Optionally, the first parameter may be at least one of a nominal power (which is a nominal power of the uplink control channel), path loss measurement-related information (e.g., resource information used for path loss measurement), or a closed-loop power control indication (e.g., a closed-loop power control process indication).

It may be understood that power control parameters configured by the network device for the terminal device may be a first parameter set, and the set includes one or more of the foregoing nominal power (which is a nominal power of the uplink control channel), path loss measurement-related information, or closed-loop power control process indication.

Optionally, the first parameter is carried by using higher layer signaling.

Optionally, the higher layer signaling may be radio resource control RRC signaling or a media access control control element MAC CE.

Further, the network device may send indication information to the terminal device, where the indication information is used to instruct to use one of the at least two first parameters in the time element i.

Optionally, the indication information is carried by using downlink control information, such as downlink control information DCI.

Optionally, the downlink control information may further carry information used to determine a PUCCH resource.

Optionally, the downlink control information may further carry a closed-loop power control indication used to determine the uplink control channel. The closed-loop power control indication used for the uplink control channel may indicate at least one of a closed-loop power control adjustment value or a closed-loop power control process.

In this way, based on the foregoing first parameters and downlink control information, the terminal device can obtain the power of the uplink control channel in the time element i. Optionally, the terminal device may obtain the power of the uplink control channel in the time element i based on the foregoing equation.

(2.2) There is No PUCCH Transmitted in the Time Element i, and a Power of a PUCCH May be Determined in a Case of Closed-Loop Power Control and TPC Accumulation.

When the terminal device currently does not transmit the PUCCH but still receives a TPC command, to ensure that TPC accumulation does not exceed an upper limit and a lower limit, the power of the PUCCH also needs to be calculated, where the upper limit is generally a maximum transmit power, and the lower limit is generally 0.

That currently there is no PUCCH transmitted generally means that a period of the PUCCH does not arrive, and the PUCCH is at a moment between two periodic transmissions. For example, when the period of the PUCCH is X, no PUCCH is transmitted between a time element t-X and a time element t (where t-X<i<t), but the terminal device may still receive downlink control information sent by the network side device. The downlink control information may include closed-loop power control information. The closed-loop power control information may be used to indicate a closed-loop power adjustment value. In a closed-loop power control accumulation mode, the power of the PUCCH still needs to be calculated to calculate the TPC accumulation between the time element t-X and the time element t, but no PUCCH needs to be sent in this period.

In this case, the time element i is not used to transmit the PUCCH. In a possible implementation, the terminal device determines a second parameter used for power control. The second parameter is at least one of a nominal power (which is a nominal power of the PUCCH), a path loss adjustment factor, a path loss, or a closed-loop power control adjustment value.

Further, the terminal device may calculate the power of the PUCCH based on a formula, a table, a sequence, or another representation form satisfying the following equation:

$$P_{PUCCH,c}(i) = \min \left\{ \begin{array}{l} P_{CMAX,c}(i), \\ P_{O\_PUCCH,c}(b) + PL_c(k_1) + g_c(i, l) \end{array} \right\}$$

Similar to (1.3), for a method of determining the second parameter used for power control, refer to specific description in the following. Details are not described herein.

(3) Reference Signal Power Determining

The terminal device may obtain power information of an SRS based on a current SRS configuration.

If there is currently no SRS transmitted, generally no periodic SRS is configured or an aperiodic SRS is not triggered.

The power of the reference signal may be determined based on a first parameter or a second parameter.

Optionally, the terminal device may calculate the power of the SRS based on a formula, a table, a sequence, or another representation form satisfying the following equation:

$$P_{SRS,c}(i) = \min\begin{Bmatrix} P_{CMAX,c}(i), \\ 10\log_{10}(M_{SRS,c}) + P_{SRS\_OFFSET} + P_{O\_SRS,c}(m) + \\ \alpha_{SRS,c} \cdot PL_c(k_2) + h_{SRS,c}(i, l) \end{Bmatrix}$$

$P_{SRS\_OFFSET}$ is a power offset of the SRS relative to the PUSCH. When a nominal power of the SRS is the same as a nominal power of the PUSCH, this parameter may compensate for the power offset of the SRS relative to the PUSCH. This parameter is not mandatory. This parameter can be 0, and can be deleted from the above formula. The subscript of $k_2$ is 2, to distinguish between a measurement resource of the SRS and a measurement resource of the PUSCH. $k_2$ and k may be the same or different. The nominal power of the SRS may be the same as or different from the nominal power of the PUSCH.

In a possible implementation, the network device may send configuration information to the terminal device, where the configuration information indicates at least two first parameters, and the at least two first parameters are candidates for power control parameters used by the terminal device to determine the uplink reference signal.

Optionally, the at least two first parameters are used to determine a power of the uplink reference signal during dynamic scheduling. Sending of the uplink reference signal may be periodic or may be aperiodically triggered. The manner of aperiodically triggering uplink reference signal sending is a dynamic scheduling manner.

Optionally, the first parameter may be at least one of a nominal power (which is the nominal power of the SRS), a path loss adjustment factor, path loss measurement-related information (e.g., resource information used for path loss measurement), or a closed-loop power control indication (e.g., a closed-loop power control process indication).

It may be understood that power control parameters configured by the network device for the terminal device may be a first parameter set, and the set includes one or more of the foregoing nominal power (which is the nominal power of the uplink reference signal), path loss adjustment factor, path loss measurement-related information, or closed-loop power control indication.

Optionally, the first parameter is carried by using higher layer signaling.

Optionally, the higher layer signaling may be radio resource control RRC signaling or a media access control control element MAC CE.

Further, the network device may send indication information to the terminal device, where the indication information is used to instruct to use one of the at least two first parameters in the time element i.

In this way, based on the foregoing first parameters and downlink control information, the terminal device can obtain the power of the uplink reference signal in the time element i. Optionally, the terminal device may obtain the power of the uplink reference signal in the time element i based on the foregoing equation.

(4) Power Headroom Determining

As a whole, PH can be expressed as a maximum power minus a power required for sending a signal. This does not mean that the power of the signal that is subtracted is a real power used when the signal is sent, and does not mean that the signal must be sent.

$$PH_c(i) = P_{CMAX,c}(i) - 10 \log_{10}(10^{P_{PUSCH}/10} + 10^{P_{PUCCH}/10} + 10^{P_{SRS}/10})$$

The formula means the maximum power minus a sum of powers of a channel and a signal that need to be simultaneously sent. This application does not limit that each physical variable in the formula needs to exist. For example, if only the PUCCH and the PUSCH are simultaneously sent, and the SRS is not simultaneously sent, a power of the SRS does not need to be subtracted. This means that if there are the PUCCH and the PUSCH to be simultaneously transmitted, the power headroom should be the maximum transmit power minus a sum of a power of the PUSCH and a power of the PUCCH. The following is an example of this:

$$PH_c(i) = P_{CMAX,c}(i) - 10 \log_{10}(10^{P_{PUSCH}/10} + 10^{P_{PUCCH}/10})$$

A corresponding formula should be used based on actual cases.

If only the PUSCH is sent, or only the PUCCH is sent, or only the SRS is sent, the PH is separately calculated in the following manner: subtracting the power of the PUSCH from the maximum power, subtracting the power of the PUCCH from the maximum power, and subtracting the power of the SRS from the maximum power.

If the PUSCH and the PUCCH are simultaneously sent, or the PUSCH and the SRS are simultaneously sent, or the PUCCH and the SRS are simultaneously sent, the PH is separately calculated in the following manner: subtracting a sum of the power of the PUSCH and the power of the PUCCH from the maximum power, subtracting a sum of the power of the PUSCH and the power of the SRS from the maximum power, or subtracting a sum of the power of the PUCCH and the power of the SRS from the maximum power.

If the PUSCH, the PUCCH, and the SRS are simultaneously sent, the PH is calculated in a manner of subtracting a sum of powers of the PUSCH, the PUCCH, and the SRS from the maximum power.

A scenario in which a plurality of signals and channels are simultaneously sent herein means a scenario in which a plurality of signals and channels can be simultaneously sent. In a current time element, if a plurality of signals and channels can be simultaneously sent, but some of the plurality of signals and channels are not sent at that time, it is also necessary to subtract a sum of powers of all the signals and channels that can be simultaneously sent from the maximum transmit power according to the assumption that the plurality of signals and channels can be simultaneously sent.

4-1 Type 1 PH (or PHR)

The type 1 PH (or PHR) is generally used when a PUSCH and a PUCCH are not transmitted at the same time, and may also be used when a PUSCH and a PUCCH exist in a time element, such as a slot. In this case, the PUSCH and the PUCCH are generally in time division multiplexing TDM.

The following three cases (4.1) to (4.3) are included.

(4.1) Case 1

The terminal device transmits the PUSCH in the time element i, and does not transmit the PUCCH. In this case, the corresponding PH is the current maximum transmit power minus the power of the PUSCH.

The terminal device obtains a corresponding power control parameter based on a current transmission configuration, and calculates the power of the PUSCH based on the power control parameter. For the obtaining, by the terminal device, a corresponding power control parameter based on a current transmission configuration, refer to a corresponding method for determining the power of the PUSCH described in 1.1.

The PH may be calculated based on the following formula:

$$PH_c(i) = P_{CMAX,c}(i) - (10 \log_{10}(M_{PUSCH,c}(i)) + P_{O\_PUSCH,c}(j) + \alpha_c(j) \cdot PL_c(k) + \Delta_{TF,c}(i) + f_c(i,l))$$

(4.2) Case 2

The terminal device transmits the PUSCH and the PUCCH in the time element i.

In this case, the power headroom is equal to the maximum transmit power minus the power of the PUSCH. However, the PUCCH is also sent at this time. In a possible case, the PUSCH occupies some symbols and the PUCCH occupies some symbols. For sending of the PUSCH and the PUCCH, there may be different power management and different power back-off parameters. In this case, Pcmax may be determined based on a power management parameter of the PUSCH rather than a power management parameter of the PUCCH. For example, in the following formula, the superscript, a wave line, of Pcmax indicates that in this case, Pcmax should be determined based on the power management parameter of the PUSCH.

$$PH_c(i) = \tilde{P}_{CMAX,c}(i) - (10 \log_{10}(M_{PUSCH,c}(i)) + P_{O\_PUSCH,c}(j) + \alpha_c(j) \cdot PL_c(k) + \Delta_{TF,c}(i) + f_c(i,l))$$

(4.3) Case 3

In this case, the PUSCH is not sent, or whether the PUSCH is sent cannot be determined.

The corresponding power headroom may be determined based on a second parameter. In this case, for determining of the power headroom, refer to the foregoing description of PUSCH power determining in 1.3.

The power headroom may be determined according to the following formula:

$$PH_c(i) = \tilde{P}_{CMAX,c}(i) - (10 \log_{10}(M_{PUSCH,c}(i)) + P_{O\_PUSCH,c}(j) + \alpha_c(j) \cdot PL_c(k) + \Delta_{TF,c}(i) + f_c(i,l))$$

For a method of determining the second parameter, refer to subsequent descriptions.

In this case, the Pcmax meets a power management requirement, and calculation may be performed based on an assumption that power management parameters MPR=0 dB, A-MPR=0 dB, P-MPR=0 dB, and ΔTc=0 dB. The maximum power reduction (Maximum Power Reduction) MPR, the additional maximum power reduction A-MPR, the power management maximum power reduction (P-MPR), and the allowed operating bandwidth edge transmission power relaxation ΔTc are all parameters used for power management. Pcmax that meets the power management requirement can be distinguished by adding a wave line to Pcmax.

Optionally, the following formula may be used for calculation:

$$PH_c(i) = \tilde{P}_{cmax,c}(i) - (P_{0\_PUSCH,c}(j_0) + \alpha_c(j_0) \cdot PL_c(k_0) + f_c(i,l_0))$$

4-2 Type 2 PH (or PHR)

The type 2 PH (or PHR) is generally used when the PUSCH and the PUCCH are simultaneously transmitted, for example, the PUSCH and the PUCCH are in frequency division multiplexing FDM in a slot.

Four cases (4.4) to (4.7) are included.

(4.4) Case 4

When the terminal device transmits the PUSCH in the time element i, and transmits the PUCCH at the same time, the terminal device obtains a corresponding power control parameter based on a current transmission configuration, and calculates powers of the PUSCH and the PUCCH based on the power control parameter. For a method of obtaining the power control parameter, refer to the description in the foregoing power determining method in 1.2.

The power headroom may be obtained by subtracting the power of the PUSCH and the power of the PUCCH from a maximum power.

Optionally, the power headroom may be determined according to the following equation:

$$PH_c(i) = P_{CMAX,c}(i) - 10\log_{10}\left( \begin{array}{l} 10^{(10\log_{10}(M_{PUSCH,c}(i)) + P_{0\_PUSCH,c}(j) + \alpha_c(j) \cdot PL_c(k) + \Delta_{TF,c}(i) + f_c(i,l))/10} + \\ 10^{(10\log_{10}(M_{PUCCH,c}(i)) + P_{0\_PUCCH}(b) + PL_c(k_1) + \Delta_{F\_PUCCH}(F) + \Delta_{PUCCH\_TF,c}(i) + g(i,l_1))/10} \end{array} \right)$$

(4.5) Case 5

The terminal device transmits the PUSCH in the time element i and does not transmit the PUCCH.

The power of the PUSCH may be determined in the manner in (1.1), and the power of the PUCCH may be determined based on a second parameter. For determining of the power of the PUCCH, refer to the description in 2.2.

Optionally, the PH (or PHR) may be determined according to one of the following formulas.

Optionally, the second parameter may be indicated by the network device, or is a default value, or is selected by the terminal device. For this case, refer to the following formula:

$$PH_c(i) = P_{CMAX,c} - 10\log_{10}\left( \begin{array}{l} 10^{(10\log_{10}(M_{PUSCH,c}(i)) + P_{0\_PUSCH,c}(j) + \alpha_c(j) \cdot PL_c(k) + \Delta_{TF,c}(i) + f_c(i,l))/10} + \\ 10^{(P_{0\_PUCCH}(b_0) + PL_c(k_0) + g(i,l_0))/10} \end{array} \right)$$

Alternatively, the second parameter for the PUCCH may be determined based on a first parameter used for the PUSCH.

In the following formula, influence factors k and l of the second parameter for the PUCCH are the same as influence factors k and l of the first parameter for the PUSCH, and an influence factor $b_0$ of the second parameter for the PUCCH is obtained through association of j. For example, $b_0$ and j correspond to a same beam assumption.

$$PH_c(i) = P_{CMAX,c}(i) - 10\log_{10}\left(\begin{array}{l}10^{(10\log_{10}(M_{PUSCH,c}(i))+P_{0\_PUSCH,c}(j)+\alpha_c(j)\cdot PL_c(k)+\Delta_{TF,c}(i)+f_c(i,l))/10} + \\ 10^{(P_{0\_PUCCH}(b_0)+PL_c(k)+g(i,l))/10}\end{array}\right)$$

Pcmax is calculated based on a power management requirement of the PUSCH. Alternatively, Pcmax is obtained based on a power management requirement for simultaneously transmitting the PUSCH and the PUCCH.

(4.6) Case 6

The terminal device transmits the PUCCH in the time element i and does not transmit the PUSCH.

The power of the PUCCH may be determined in the manner in (2.1), and the power of the PUSCH may be determined based on a second parameter.

Optionally, the PH (or PHR) may be determined according to one of the following formulas.

Optionally, the second parameter may be indicated by the network device, or is a default value, or is selected by the terminal device. For this case, refer to the following formula:

$$PH_c(i) = P_{CMAX,c}(i) - 10\log_{10}\left(\begin{array}{l}10^{(P_{0\_PUSCH,c}(j_0)+\alpha_c(j_0)\cdot PL_c(k_0)+f_c(i,l_0))/10} + \\ 10^{(10\log_{10}(M_{PUCCH,c}(i))+P_{0\_PUCCH}(b)+PL_c(k_1)+\Delta_{F\_PUCCH}(F)+\Delta_{PUCCH\_TF,c}(i)+g(i,l))/10}\end{array}\right)$$

Alternatively, the second parameter for the PUSCH may be determined based on a first parameter used for the PUCCH.

In the following formula, influence factors $k_1$ and $l_1$ of the second parameter for the PUSCH are the same as influence factors $k_1$ and $l_1$ of the first parameter for the PUCCH, and an influence factor $j_0$ of the second parameter for the PUSCH is obtained through association of b. For example, $j_0$ and b correspond to a same beam assumption.

$$PH_c(i) = P_{CMAX,c}(i) - 10\log_{10}\left(\begin{array}{l}10^{(P_{0\_PUSCH,c}(j_0)+\alpha_c(j_0)\cdot PL_c(k_1)+f_c(i,l_1))/10} + \\ 10^{(10\log_{10}(M_{PUCCH,c}(i))+P_{0\_PUCCH}(b)+PL_c(k_1)+\Delta_{F\_PUCCH}(F)+\Delta_{PUCCH\_TF,c}(i)g+(i,l)/10}\end{array}\right)$$

Pcmax is calculated based on a power management requirement of the PUSCH. Alternatively, Pcmax is obtained based on a power management requirement for simultaneously transmitting the PUSCH and the PUCCH.

(4.7) Case 7

The terminal device transmits neither the PUCCH nor the PUSCH in the time element i. Powers of both the PUSCH and the PUCCH may be determined based on second parameters. For a method of determining the second parameter, refer to subsequent descriptions. Details are not described herein.

In this case, both the second parameter for the PUSCH and the second parameter for the PUCCH may satisfy a same beam assumption. A subscript 0 in the following formula indicates that a corresponding parameter is the second parameter.

$$PH_c(i) = P_{CMAX,c}(i) - 10\log_{10}\left(\begin{array}{l}10^{(P_{0\_PUSCH,c}(j_0)+\alpha_c(j_0)\cdot PL_c(k_0)+f_c(i,l_0))/10} + \\ 10^{(P_{0\_PUCCH}(b_0)+PL_c(k_0)+g(i,l_0))/10}\end{array}\right)$$

4-3 Type 3 PH (or PHR)

The type 3 PH (or PHR) is used to support SRS switching (switching). In this scenario, only an SRS is sent on some carriers for measurement.

The following two cases (4.8) and (4.9) are included.

(4.8) Case 8

When an SRS is currently transmitted, a power parameter of the current SRS is determined, and a power of the SRS may be obtained based on the current power parameter. For details, refer to the description in (3).

Optionally, the PH (or PHR) may be obtained according to the following formula.

In the following formula, for example, a current SRS beam resource corresponds to a measurement source $k_2$.

$$PH_c(i)=P_{CMAX,c}(i)-(10\ \log_{10}(M_{SRS,c})+P_{SRS\_OFFSET}+ \\ P_{O\_SRS,c}(m)+\alpha_{SRS,c}\cdot PL_c(k_2)+h_{SRS,c}(i,l))$$

An offset parameter of the SRS may be 0. In this case, this parameter may be removed, and the formula is as follows:

$$PH_c(i)=P_{CMAX,c}(i)-(10\ \log_{10}(M_{SRS,c})+P_{O\_SRS,c}(m)+ \\ \alpha_{SRS,c}\cdot PL_c(k_2)+h_{SRS,c}(i,l_2))$$

Optionally, if the terminal device sends the SRS and does not send the PUSCH within the time element, the Pcmax used by the terminal device may be calculated based on a power management requirement of the SRS. If the terminal device sends the SRS and the PUSCH within the time element, the Pcmax used by the terminal device may be calculated based on the power management requirement of the SRS, or obtained based on a power management requirement for simultaneously transmitting the PUSCH and the SRS.

(4.9) Case 9

When the terminal device does not send the SRS, the terminal device may calculate the PH based on a second parameter.

Optionally, the PH (or PHR) may be calculated according to the following formula:

$$PH_c(i)=P_{CMAX,c}(i)-(P_{O\_SRS,c}(m_0)+\alpha_{SRS,c}\cdot \\ PL_c(k_0)+h_{SRS,c}(i,l_0))$$

In this case, the Pcmax meets a power management requirement, and calculation may be performed based on an assumption that power management parameters MPR=0 dB, A-MPR=0 dB, P-MPR=0 dB, and ΔTc=0 dB.

Optionally, if the terminal device does not send the SRS but sends the PUSCH in the time element, the Pcmax used by the terminal device may be calculated based on an assumption that the power management parameters MPR=0 dB, A-MPR=0 dB, P-MPR=0 dB, and ΔTc=0 dB, or may be calculated based on a power management parameter corresponding to the PUSCH transmission assumption.

4-4 Type 4 PH (or PHR)

This type of PH may be used to calculate PUCCH-related PH (or PHR).

The following three cases (4.10) to (4.12) may be included.

(4.10) Case 10

In the time element i, a PUSCH and a PUCCH may be transmitted on non-overlapping time resources. There may be a plurality of formats of the PUCCH. The PUCCH in some formats occupies a relatively small quantity of symbols, for example, one or two OFDM symbols, and may occupy a relatively large quantity of frequency domain resources. A PUCCH in this format is referred to as a short PUCCH according to a feature that the PUCCH occupies fewer symbols. When the short PUCCH and the PUSCH are sent in a time element, a time division manner may be used, that is, OFDM symbols occupied by the PUSCH are different from OFDM symbols occupied by the PUCCH. Because this PUCCH may occupy a part of bandwidth, bandwidth allocation is relatively important for this PUCCH. In this case, PH of the PUCCH needs to be calculated. In this case, a power of the PUCCH may be subtracted from a maximum transmit power to obtain the power headroom.

When only the PUCCH is sent, and no PUSCH is sent, refer to the description in 2.1. In this case, the terminal device may obtain a corresponding power control parameter based on a current transmission configuration, and calculate the power of the PUCCH based on the power control parameter. The power headroom may be obtained by subtracting the power of the PUCCH from the maximum power.

Optionally, corresponding PH (or PHR) may be determined according to the following formula:

$$PH_c(i) = P_{CMAX,c}(i) - (10 \log_{10}(M_{PUCCH,c}(i)) + P_{0\_PUCCH}(b) + PL_c(k_1) + \Delta_{F\_PUCCH}(F) + \Delta_{PUCCH\_TF,c}(r) + g(i, l_1))$$

In this case, the Pcmax should meet a power management requirement, and may be calculated based on a power management requirement for transmitting only the PUCCH.

(4.11) Case 11

Case 10 is about a scenario in which a PUCCH is transmitted and no PUSCH is transmitted. Case 10 may be extended to case 11: a scenario in which both a PUCCH and a PUSCH are transmitted. In this case, the Pcmax may be different for the PUSCH and/or the PUCCH due to a power management factor. In this case, the Pcmax may be determined based on a power management parameter of the PUSCH or the PUCCH. A calculation method in case 11 is the same as that in case 10, and a difference is a Pcmax calculation manner.

In this case, the Pcmax may be calculated based on a power management requirement according to an assumption that only the PUCCH is transmitted.

Alternatively, the Pcmax may be calculated based on a power management requirement according to an assumption that only the PUSCH is transmitted. Alternatively, the Pcmax may be calculated based on a power management requirement according to an assumption that only the PUCCH is transmitted.

The Pcmax may be identified by using a tilde to express the power management requirement herein.

Optionally, corresponding PH (or PHR) may be determined according to the following formula:

$$PH_c(i) = \tilde{P}_{CMAX,c}(i) - (10 \log_{10}(M_{PUCCH,c}(i)) + P_{0\_PUCCH}(b) + PL_c(k_1) + \Delta_{F\_PUCCH}(F) + \Delta_{PUCCH\_TF,c}(i) + g(i, l_1))$$

(4.12) Case 12

The terminal device does not transmit a PUCCH in the time element i.

In this case, the power headroom of the PUCCH may be calculated based on a second parameter.

Optionally, PH (or a PHR) of the PUCCH may be determined according to the following formula:

$$PH_c(i) = \tilde{P}_{CMAX,c}(i) - (P_{0\_PUCCH}(b) + PL_c(k_1) + g(i, l_1))$$

Alternatively, because this is a PH calculation method for transmitting a short symbol PUCCH, in calculation, a power offset of a short symbol format of the PUCCH may be added:

$$PH_c(i) = \tilde{P}_{CMAX,c}(i) - (P_{0\_PUCCH}(b_0) + PL_c(k_0) + \Delta_{F\_PUCCH}(F) + g(i, l_0))$$

For determining of the second parameter, refer to subsequent descriptions. Details are not described herein.

In the foregoing equation for determining a power or power headroom, at least one parameter may be increased or decreased or a coefficient may be changed, which is not limited herein.

In the foregoing scenario in which a second parameter is required, the terminal device may not perform corresponding PH calculation and/or reporting by default, or as instructed by the network device. If PH calculation and/or reporting are/is required, refer to the method for determining the second parameter described below.

It may be understood that impact of parameters in the foregoing formula on a power or power headroom may be decoupled based on the foregoing formula to obtain a corresponding method for determining a power or power headroom based on one or more of the parameters. Methods for determining these parameters should also be understood as being implemented independently or in combination. Details are not described herein.

For meanings of the parameters, refer to the foregoing description. Details are not described herein again.

The following describes a method for determining a second parameter in the foregoing power determining or power headroom determining.

A determining method 1 includes:

sending, by the network device, indication information to the terminal device, where the indication information indicates one of the at least two first parameters; and determining, by the terminal device, the second parameter based on the indication information.

1. For example, the second parameter is $P_O$ or $\alpha$.

According to the foregoing description, j is an influence factor of $P_{O\_PUSCH}$ or $\alpha$; b is an influence factor of $P_{O\_PUCCH}$; and m is an influence factor of $P_{O\_SRS}$.

Optionally, the network device configures a correspondence between an index of j and $P_{O\_PUSCH}$ and/or $\alpha$, and/or a correspondence between an index of b and $P_{O\_PUCCH}$, and/or a correspondence between an index of m and $P_{O\_SRS}$ (and/or $\alpha_{SRS}$) for the terminal device.

The terminal device may obtain the correspondence between the index of j and $P_{O\_PUSCH}$ and/or $\alpha$, and/or the correspondence between the index of b and $P_{O\_PUCCH}$, and/or the correspondence between the index of m and $P_{O\_SRS}$ (and/or $\alpha_{SRS}$). The network device and the terminal device have a consistent understanding about the correspondences.

A total quantity of indexes of j may be J, a total quantity of indexes of b may be B, and a total quantity of indexes of m may be M'. M' represents a total quantity of nominal powers of an SRS, and is distinguished from a bandwidth parameter M.

The correspondences may be predefined in a protocol or obtained through configuration. The correspondences are stored in the network device and the terminal device in a form of a table, a sequence, a formula, code, or the like. A specific storage form may not be limited.

Because $P_O$ or $\alpha$ is an open-loop parameter, an index of each j or b or m may correspond to a group of open-loop parameters, and the group of open-loop parameters may include $P_O$ and/or $\alpha$. In this way, J may be a total quantity of PUSCH-related open-loop parameter groups that are configured, and J groups are configured in total. Optionally, J may be an integer greater than 1. B may be a total quantity of PUCCH-related open-loop parameter groups that are configured, and B groups are configured in total. M' may be a total quantity of SRS-related open-loop parameter groups that are configured, and M' groups are configured in total.

As described in (1.1) or (2.1), the network device sends configuration information to the terminal device, where the configuration information indicates at least two first parameters used for dynamic scheduling, and the first parameter is $P_O$ or $\alpha$.

For the PUSCH, the configuration information may indicate at least two $P_{O\_PUSCH}$ and at least two $\alpha$.

For the PUCCH, the configuration information may indicate at least two $P_{O\_PUCCH}$.

For the SRS, the configuration information may indicate at least two $P_{O\_SRS}$ (and/or $\alpha_{SRS}$).

The terminal device receives an indication of the at least two first parameters.

Optionally, that the configuration information indicates at least two first parameters used for dynamic scheduling includes:

the configuration information includes indexes of different j or b corresponding to the at least two first parameters.

As mentioned above, j or b is a parameter related to a transmission manner and/or a transmission configuration.

The terminal device may determine $P_O$ and/or $\alpha$ corresponding to the time element i by receiving a further indication of the network device, for example, by using an index of j, b, or m included in PUSCH scheduling information; or may determine $P_O$ and/or $\alpha$ corresponding to the time element i based on a current transmission manner and/or transmission configuration, for example, based on at least one of numerology, beam information, transmission service information, or the like. The transmission manner and/or the transmission configuration may be carried in higher layer signaling, or may be carried in downlink control information. The transmission configuration in this application includes at least one of a transmission beam, a transmission waveform (such as cyclic prefix orthogonal frequency division multiplexing CP-OFDM, or discrete Fourier transform spread-based orthogonal frequency division multiplexing DFT-S-OFDM), a transmission service (such as URLLC or eMBB), numerology, a bandwidth part BWP, a carrier, a time domain length, a slot set, and the like. The beam information may be represented by using an SRS resource identifier.

A correspondence between j or b or m and the first parameter, and/or a correspondence between j or b or m and a transmission manner and/or a transmission configuration may be predefined in a protocol, and is pre-stored in the network device and the terminal device side, or may be configured by the network device for the terminal device. There may be three manners:

In a first possible manner, the configuration information may further include at least two first parameters corresponding to the indication of the at least two first parameters.

In a second possible manner, the configuration information may further include transmission manners and/or transmission configuration information (or indexes or identifiers corresponding to the transmission manners and/or the transmission configuration information) corresponding to the at least two first parameters corresponding to the indication of the at least two first parameters. In this application, an index, an identifier, a value, or a sequence number may represent a similar meaning and may be replaced with each other unless otherwise specified.

In this way, the network device may configure a transmission configuration for the terminal device to calculate a power and/or PH. For example, the network device may configure a specific synchronization signal SS, a specific SSB and/or CSI-RS resource, an enhanced mobile broadband eMBB service, a bandwidth part BWP, numerology, and the like for the terminal device.

In a third possible manner, the configuration information may further include the at least two first parameters corresponding to the indication of the at least two first parameters, and the corresponding transmission manners and/or transmission configuration information (or the indexes or identifiers corresponding to the transmission manners and/or the transmission configuration information).

With reference to one of the foregoing three manners, optionally, the network device may send indication information to the terminal device, where the indication information indicates a second parameter.

The second parameter is used for determining at least one of an uplink data channel power, an uplink control channel power, an uplink reference signal power, or power headroom when the time element i is not used to transmit at least one of an uplink data channel, an uplink control channel, or an uplink reference signal.

Optionally, the indication information may be an index (or referred to as a sequence number, an identifier, or a value) of j corresponding to $P_{O\_PUSCH}$ Hand/or $\alpha$ ($j_0$ or reference j for short) when the time element i is not used to transmit the PUSCH; and/or an index (or referred to as a sequence number, an identifier, or a value) of b corresponding to $P_{O\_PUCCH}$ ($b_0$ or reference b for short) when the time element i is not used to transmit the PUCCH; and/or an index of m corresponding to $P_{O\_SRS}$ when the time element i is not used to transmit the SRS.

Optionally, the indication information may be a transmission manner and/or transmission configuration information (or an index) corresponding to $P_{O\_PUSCH}$ and/or $\alpha$ when the time element i is not used to transmit the PUSCH; and/or transmission configuration information (or an index) corresponding to $P_{O\_PUCCH}$ when the time element i is not used to transmit the PUCCH; and/or transmission configuration information (or an index) corresponding to $P_{O\_SRS}$ (and/or $\alpha_{SRS}$) when the time element i is not used to transmit the SRS.

Optionally, the indication information is also included in the configuration information.

Optionally, the second parameter is one of the at least two first parameters. To be specific, the index of j corresponding to $P_{O\_PUSCH}$ and/or $\alpha$ when the time element i is not used to transmit the PUSCH may be one of the indexes of j included in the foregoing configuration information. Similarly, the index of b corresponding to $P_{O\_PUCCH}$ when the time element i is not used to transmit the PUCCH may be one of the indexes of b included in the foregoing configuration information. The index of m corresponding to $P_{O\_SRS}$ (and/or $\alpha_{SRS}$) when the time element i is not used to transmit the SRS may be one of the indexes of m included in the foregoing configuration information.

In this way, the terminal device can determine the second parameter according to a value of j and/or a value of b and/or a value of m, or the transmission manner and/or transmission configuration information (or the index), and further determine at least one of the power of the PUSCH, the power of the PUCCH, the power of the SRS, or the power headroom in the time element i.

For example, when the indication information indicates an index of j and the indication information is included in the configuration information, a corresponding protocol description may be as follows, where an information element (or a field) Jforvirtual is indication information used to indicate the index of j corresponding to $P_{O\_PUSCH}$ and/or $\alpha$ (in this application, $P_O$ is also referred to as p0, and $\alpha$ is also referred to as alpha) when the time element i is not used to transmit the PUSCH. Some of the indexes of j, for example, j=0, 1, 2 (J is greater than 2), correspond to $P_{O\_PSUCH}$ and/or $\alpha$ used for power control during dynamic scheduling, and a value of Jforvirtual may be one of j corresponding to dynamic scheduling, for example, one of 0, 1, and 2. A specific value may be determined based on a requirement.

```
UplinkPowerControl::=    SEQUENCE {
    J                    INTEGER (0...J-1)
    Jforvirtual          
    {
        j                0
            p0           INTEGER (-126..24)
            alpha        ENUMERATED {al0, al04, al05, al06, al07, al08,
al09, al1}
    }
    ...
        j                1
            p0           INTEGER (-126..24)
            alpha        ENUMERATED {al0, al04, al05, al06, al07, al08,
al09, al1}
    }
    ...
        j                2
            p0           INTEGER (-126..24)
            alpha        ENUMERATED {al0, al04, al05, al06, al07, al08,
al09, al1}
    }
    ...
    {
        j                J-1
            p0           INTEGER (-126..24)
            alpha        ENUMERATED {al0, al04, al05, al06, al07, al08,
al09, al1}
    }
}
```

For example, when the indication information indicates a transmission manner and/or transmission configuration information and the indication information is included in the configuration information, a corresponding protocol description may be as follows, where an information element (or a field) Propertyforvirtual is used to indicate a transmission manner and/or transmission configuration information corresponding to $P_{O\_PUSCH}$ and/or a when the time element i is not used to transmit the PUSCH. The configuration information further includes an index of j, $P_{O\_PUSCH}$ and/or $\alpha$ (p0, alpha) corresponding to j, and a corresponding transmission manner and/or transmission configuration information (Property). Some of the indexes of j, for example, j=0, 1, 2 (J is greater than 2), correspond to $P_{O\_PUSCH}$ and/or a that are/is used for power control during dynamic scheduling, and the transmission manner and/or transmission configuration information in Propertyforvirtual may be one of transmission configurations corresponding to dynamic scheduling, for example, a transmission manner and/or transmission configuration information corresponding to one of j=0, 1, 2. A specific value of j may be determined based on a requirement.

```
UplinkPowerControl::=    SEQUENCE {
    J                    INTEGER (0...J-1)
    Propertyforvirtual   ::= SEQUENCE {
        numerology       ENUMERATED{15k, 30k, 60k...}
        logic channel    ENUMERATED{eNBB, URLLC...}
        Beamindex        SRS resource Index
    }
}
```

```
    {
        j                          0
            p0                     INTEGER (-126..24)
            alpha                  ENUMERATED {al0, al04, al05, al06, al07, al08,
al09, al1}
            Property
    }
    ...
        j                          1
            p0                     INTEGER (-126..24)
            alpha                  ENUMERATED {al0, al04, al05, al06, al07, al08,
al09, al1}
            Property
    }
    ...
        j                          2
            p0                     INTEGER (-126..24)
            alpha                  ENUMERATED {al0, al04, al05, al06, al07, al08,
al09, al1}
            Property
    }
    ...
    {
        j                          J-1
            p0                     INTEGER (-126..24)
            alpha                  ENUMERATED {al0, al04, al05, al06, al07, al08,
al09, al1}
            Property
    }
}
```

2. For Example, the Second Parameter is a PL.

Generally, a PL of the terminal device is obtained based on resource information configured by the network device for path loss measurement.

According to the foregoing description, k has a correspondence with a resource of a reference signal (RS) for measuring a path loss.

Specifically, subscripts (also referred to as indexes) 0, 1, 2 . . . of k may correspond to different resources of the reference signal (RS) for measuring a path loss.

Optionally, the network device sends configuration information to the terminal device, where the configuration information indicates at least two first parameters corresponding to dynamic scheduling, and the first parameter is information about a resource for measuring a path loss.

Optionally, the information about the resource for measuring a path loss may be information about a resource of the reference signal for measuring a path loss, for example, an identifier of the resource of the reference signal.

In a possible manner 1, the configuration information may include the information about the resource for measuring a path loss.

In a possible manner 2, the configuration information may include an index of k corresponding to the information about the resource for measuring a path loss.

In this case, a correspondence between the index of k and the information about the resource for measuring a path loss may be predefined, and is stored in the network device and the terminal device.

Optionally, the correspondence between the index of k and the information about the resource for measuring a path loss may be configured by the network device for the terminal device. For example, in a possible manner 3, the configuration information includes both the information about the resource for measuring a path loss and the index of k corresponding to the information about the resource for measuring a path loss.

Optionally, the information about the resource for measuring a path loss may be channel state information reference signal CSI-RS resource information.

In a possible manner 4, the information about the resource for measuring a path loss may further have a correspondence with beam information, such as downlink beam information or uplink beam information.

In this way, when the correspondence between the information about the resource for measuring a path loss and the beam information is predefined or configured by the network device for the terminal device, the configuration information may include the beam information, and the beam information has a correspondence with the information about the resource for measuring a path loss.

With reference to one of the foregoing possible manners 1, 2, 3, and 4, a method for determining the PL may include:

sending, by the network device, indication information to the terminal device, where the indication information indicates one of the at least two first parameters.

In this way, the terminal device determines, based on the indication information, a second parameter (also referred to as a reference PL) obtained when the time element i is not used to transmit at least one of an uplink data channel, an uplink control channel, or an uplink reference signal.

Further, the terminal device may determine at least one of an uplink data channel power, an uplink control channel power, an uplink reference signal power, or power headroom in the time element i based on the second parameter.

Optionally, the indication information may include at least one of the index of k, the information about the resource for measuring a path loss, or the beam information.

Optionally, the second parameter may correspond to the CSI-RS resource information. In an actual system, the network device may send a CSI-RS corresponding to a CSI-RS resource, and the CSI-RS is processed in a coverage-first manner. For example, no beamforming is performed on the CSI-RS corresponding to the CSI-RS resource. In this way, a path loss of PH that is calculated by the terminal device may be greater than a path loss of real transmission, and a result of the PH is lower. Consequently, the network device decides to configure fewer resources for the terminal device, and resource utilization of the system is relatively low. Alternatively, the CSI-RS resource information corresponding to the second parameter corresponds to a beamformed BF-ed CSI-RS. In this case, the foregoing problem of low resource utilization can be avoided. However, beamforming of a measurement resource that is used by the terminal device to calculate the path loss of the PH may be different from beamforming of a measurement resource during real data transmission. Because a beam gain is high, there may be a relatively large difference between the path losses of the two resources. Consequently, the network device may configure more or fewer resources.

Optionally, the beam information corresponding to the second parameter may be downlink beam information, for example, a time index of a synchronization signal block SSB.

In this case, the network device indicates, to the terminal device, a specific SSB, such as a time domain number (also referred to as a time index), where the time domain number may be a number of an OFDM symbol on which the SSB is located, so that the terminal device obtains the value of the second parameter (PL) by using a reference signal received power RSRP measured on the SSB corresponding to the specific symbol number. In general, the network device uses a beamforming technology with a relatively low beam gain and a relatively wide beam coverage for the SSB, and a beam for transmitting real data of the terminal device may be a beam with a higher beam gain within a coverage area of the SSB. In this way, a path loss calculated by the terminal device based on the specific SSB is less different from a path loss of real data transmission of the terminal device.

Optionally, the beam information may be uplink beam information, such as information about an uplink PUSCH beam. The uplink beam information may be indicated by using an SRS resource, for example, may be indicated by using a resource number of an SRS, or may be indicated by using a resource number of a CSI-RS.

In this way, the network device may indicate a specific PUSCH beam to the terminal device, for example, a specific SRS resource identifier. e.g. SRS resource index (SRI).

Optionally, the network device may indicate, to the terminal device, a beam resource used for downlink transmission. The terminal device uses, based on a correspondence between the beam resource used for downlink transmission and a beam resource used for uplink transmission, the beam resource used for downlink transmission as a reference for determining the second parameter. For example, the terminal device measures a path loss by using the beam resource used for downlink transmission as a downlink signal corresponding to the reference for determining the second parameter. Further, the terminal device calculates a power or PH by using the path loss as the second parameter. In this way, PH obtained when the terminal device performs uplink transmission by using an uplink beam that is symmetrical to downlink receiving is proper. In this way, when there is no uplink beam resource indication, the UE may have a downlink beam indication, and the UE may fully use the downlink beam indication to obtain a measurement resource for measuring a path loss.

3. For Example, the Second Parameter is f, g, and/or h.

Similar to determining $P_O$ and $\alpha$ in point 1, according to the foregoing description, l is an influence factor of f, g, and/or h.

Optionally, the network device sends configuration information to the terminal device, where the configuration information indicates at least two first parameters used for dynamic scheduling, and the first parameters are f, g, and/or h.

For the PUSCH, the configuration information may indicate at least two f.

For the PUCCH, the configuration information may indicate at least two g.

For the SRS, the configuration information may indicate at least two h.

Optionally, there is a correspondence between an index of l and f, g, and/or h. The correspondence may be predefined in a protocol, and is pre-stored in the network device and the terminal device side, or may be configured by the network device for the terminal device.

Optionally, that the configuration information indicates at least two first parameters used for dynamic scheduling may include:

the configuration information includes indexes of l corresponding to the at least two first parameters used for dynamic scheduling.

Optionally, the configuration information may further include at least two first parameters corresponding to indexes of l.

In this way, a method for determining the second parameter may include:

sending, by the network device, indication information to the terminal device, where the indication information indicates the second parameter; and the second parameter is used for determining at least one of an uplink data channel power, an uplink control channel power, an uplink reference signal power, or power headroom when the time element i is not used to transmit at least one of an uplink data channel, an uplink control channel, or an uplink reference signal.

Optionally, the indication information may be an index of l corresponding to the second parameter.

Optionally, the indication information may be included in the configuration information, or may not be included in the configuration information.

Optionally, the second parameter is one of the at least two first parameters.

Optionally, in the foregoing protocol description, the configuration information indicating the at least two first parameters includes the indication information indicating the second parameter. The indication information indicating the second parameter may be alternatively carried in different signaling from that of the configuration information. The signaling may be sent by using RRC signaling, or may be sent by using a MAC CE.

In another possible manner of the determining method 1, the network device indicates a value of the second parameter to the terminal device.

The second parameter may be one of the at least two first parameters, or may be different from the at least two first parameters.

For example, the network device may indicate alpha=1 as the second parameter.

Optionally, in the determining method 1, one of the at least two first parameters or a value of the second parameter that is indicated by the network device may be related to a capability of the terminal device and/or a second parameter preferred by the terminal device. For example, the network device may determine, based on a support level of the terminal device for a transmission service, a transmission beam, or the like, or based on the second parameter preferred by the terminal device, the value of the second parameter or one of the at least two first parameters that is indicated to the terminal device.

In this case, optionally, the terminal device may report a capability of supporting a transmission service, a transmission beam, and/or the like, and/or the terminal device may notify the network device of the second parameter preferred by the terminal device. For a specific notification manner, refer to the foregoing direct or indirect indication manner of the first parameter. Details are not described herein again.

In the determining method 1, the second parameter is determined in an indication manner. The network device may clearly understand a parameter used by the terminal device to determine a power or power headroom, and when a parameter needs to be changed, can require the terminal device to perform calculation by using a new parameter value. This gives network device controllability, allowing the network device to perform differentiated configuration for terminal devices with different requirements in different scenarios.

Determining Method 2:

The terminal device determines, in a time element i that is not used to transmit at least one of an uplink data channel, an uplink control channel, or an uplink reference signal, a second parameter in the time element i based on a first parameter used in most recent dynamic scheduling before the time element i, or an influence factor corresponding to the first parameter, such as at least one of j, b, m, k, or l, or other information corresponding to the first parameter, such as a transmission manner and/or transmission configuration information, or beam information.

Optionally, information about j used for determining a power of a PUSCH when the PUSCH is transmitted during most recent dynamic scheduling is used as $j_0$; and/or information about b used for determining a power of a PUCCH when the PUCCH is transmitted during most recent dynamic scheduling is used as $b_0$; and/or information about m used for determining a power of an SRS when the SRS is transmitted during most recent dynamic scheduling is used as $m_0$; and/or information about k used for determining a PL during most recent dynamic scheduling is used as $k_0$; and/or information about l used for determining f, g, and/or h during most recent dynamic scheduling is used as $l_0$.

Further, the second parameter in the time element i is determined based on at least one of $j_0$, $b_0$, $m_0$, $k_0$, and $l_0$.

During most recent dynamic scheduling, at least one of j, b, m, k, or l may be indicated by using downlink control information sent by the network device to the terminal device. Optionally, the downlink control information may directly carry the information about the used j, b, m, k, or l; or the information about j, b, m, k, or l may be indirectly indicated by using other information. For example, a value of j, b, or m is indirectly indicated by using a transmission manner and/or transmission configuration information, and the information about k is indirectly indicated by using beam information. For a solution of indirect indication, refer to the description in the determining method 1. Details are not described herein again.

The terminal device determines a PL based on a measurement resource corresponding to a latest beam, or determines a PL based on a latest value of k, and this can improve accuracy of the PL. The measurement resource may be an SSB or CSI-RS resource. A reason is that when the terminal device does not receive a beam indication corresponding to the time element i, the terminal device may perform receiving and/or sending based on a previous beam. Such a beam is relatively stable for current possible transmission of the terminal device. In this case, although the terminal device does not receive uplink scheduling information (also referred to as a UL grant), the terminal device still maintains calculation of a plurality of PLs (k) in a previous period. In this case, the terminal device still forms a receive beam according to a previous assumption. Therefore, a PL calculated based on the most recently used k or a measurement resource corresponding to k is more accurate. Optionally, the terminal device and the network device should have a consistent understanding of the latest beam.

Determining Method 3:

In the determining method 2, the terminal device determines the second parameter based on a first parameter used for most recent dynamic scheduling (or an influence factor corresponding to the first parameter or other information corresponding to the first parameter, such as a transmission manner and/or transmission configuration information, and/or beam information).

Similar to the determining method 2, in the determining method 3, the terminal device determines the second parameter based on one of at least two first parameters according to a protocol predefinition.

Optionally, the determining method 3 may be applied to each of the foregoing first parameters, or the determining method 3 may be applied to some of the foregoing first parameters. In this manner, the network device may configure at least one group of parameters for a default transmission characteristic.

For example, the terminal device may calculate PH based on a default group of first parameters. In this manner, the terminal device may calculate the PH after receiving the default first parameter (a first parameter for reference), and does not need to calculate the PH till receiving all of the foregoing at least two groups of (or two) first parameters. In addition, the default (predefined) first parameter may be a first reference parameter corresponding to one carrier of a serving cell. When there are a plurality of serving cells and/or a plurality of carriers, each carrier may have a first reference parameter corresponding to the carrier. In other words, this manner may be combined with determining of a serving cell and/or a carrier. Optionally, the carrier may be indicated by using transmission configuration information, or there may be only one carrier (that is, no indication is required) and/or only one serving cell. For details, refer to descriptions of other parts in this application. Optionally, a protocol may pre-define a first parameter used to determine the second parameter, or an influence factor of the first parameter, or other information corresponding to the first parameter, such as a transmission manner and/or transmission configuration information, and/or beam information.

For example, when $J \geq 3$, a specific value of j may be determined by default, for example, j=3, and a corresponding first parameter is used as the second parameter.

For example, the PH is calculated according to a specific transmission configuration by default. For example, the terminal device may calculate the PH based on a predefined resource number of a measurement resource. The measurement resource may be an SSB or CSI-RS resource. In this manner, the network device does not send information to the terminal device to notify the terminal device of which first parameter (or which group of first parameters) is used as the default parameter. Implementation for the terminal device is relatively simple, but this method cannot be compatible with capabilities and requirements of different terminal devices.

Optionally, a resource that is predefined in the protocol and that is used to determine the second parameter PL may be in a serving cell for which the PH is calculated, or may be in another serving cell.

Determining Method 4:

The foregoing determining methods 1 to 3 are based on a network device indication or a protocol pre-definition.

In the determining method 4, the terminal device can select a second parameter used by the terminal device.

Optionally, the terminal device may notify the network device of information corresponding to the second parameter used by the terminal device.

Optionally, the determining method 4 may be applied to each of the foregoing second parameters, or the determining method 4 may be applied to some of the foregoing second parameters.

For example, the terminal device may choose used p0, alpha, PL-related information (e.g., resource information for measuring the PL or beam information), and/or f/g/h. Optionally, the terminal device may select from at least two of p0 and/or alpha, PL, and/or f/g/h indicated by received configuration information.

Further, the terminal device needs to notify the network device of information corresponding to at least one of the selected p0, alpha, PL-related information (e.g., resource information for measuring the PL, or beam information), and/or f/g/h. For example, the terminal device may notify the network device of at least one of used j/b/m/k/l, specific p0/alpha/PL-related information/a value of f/g/h, or a corresponding transmission manner and/or transmission configuration information. Optionally, the terminal device may report the information simultaneously when reporting a PHR.

The terminal device may select a beam resource that the terminal device considers appropriate. The beam resource corresponds to j/b/m/k/l. Optionally, the beam resource may correspond to a measurement resource. The terminal device may determine a value of the second parameter PL based on the beam resource.

The terminal device may determine, based on one or more of the following manners, PL-related information used to determine a reference PL, and further determine the reference PL based on the PL-related information.

A. Select a beam resource whose corresponding path loss change exceeds a threshold;

B. Select a beam resource whose corresponding path loss change does not exceed a threshold; and C. Select an optimal beam resource, for example, a beam resource with a least path loss and a highest receive power.

The foregoing threshold may be predefined by using a protocol, and stored in the terminal device and/or the network device, or may be configured by the network device for the terminal device.

It may be understood that the foregoing determining methods 1, 2, 3, and 4 may be separately implemented or used together. For example, some second parameters are determined according to the method 1, and some second parameters are determined according to the method 2. This is not limited herein.

In addition, various possible implementation solutions in the methods for determining the second parameter may be used separately, or may be used together. For example, when a parameter J corresponding to an open-loop parameter needs to be determined, a plurality of methods may be combined. Specifically, the terminal device may select a beam resource that the terminal device needs to be reported, and the network device may configure a transmission configuration (or a first parameter (or an indication) used to determine the second parameter) other than the beam resource for the terminal device. The parameter J may be obtained by combining the beam resource selected by the terminal device and the transmission configuration configured by the network device.

With reference to any one of the foregoing determining methods 1 to 4, it may be understood that in the foregoing description, the second parameters are separately determined. Optionally, a correspondence may be determined between at least two influence factors of the foregoing second parameters, such as at least two of j, b, m, k, and l. In this way, a value of one of the influence factors may be indicated to the terminal device or a value of one of the influence factors may be determined by the terminal device, so that the terminal device learns a value of another influence factor, and further determines the second parameters.

Optionally, the foregoing correspondence may be predefined in a protocol and stored in the network device and the terminal device, or may be configured by the network device for the terminal device. A specific storage manner or a specific configuration manner is not limited herein. For example, the foregoing correspondence may be correspondingly configured (or indicated) when the network device configures the first parameter.

In addition, optionally, no matter whether the foregoing determining method 1, 2, 3, or 4 is used, when a power or PH of one or more channels in the time element i is being determined, transmission manners and/or transmission configurations (e.g., beam information) corresponding to the foregoing second parameters are consistent. For example, $b_0$ for determining the power of the PUCCH and $j_0$ for determining the power of the PUSCH in the time element i correspond to a same transmission configuration. For example, a beam corresponding to $b_0$ should be the same as a beam corresponding to $j_0$.

Determining Method 5:

In the foregoing determining methods 1 to 4, the second parameters are determined separately, or are determined according to a correspondence between the second parameters.

This determining method 5 may be applied to a case in which one of the PUSCH and the PUCCH has dynamic scheduling information. For example, the determining method 5 may be used to calculate type 2 PH when the PUSCH is transmitted but no PUCCH is transmitted, or may be used to calculate type 2 PH when the PUCCH is transmitted but no PUSCH is transmitted.

In this manner, a second parameter of a channel that is not transmitted in the time element i may be determined based on a first parameter used for a channel transmitted in the time element.

A transmission manner and/or transmission configuration information corresponding to the second parameter of the channel that is not transmitted in the time element i are/is consistent with a transmission manner and/or transmission configuration information corresponding to the first parameter used for the channel transmitted in the time element.

Case 1: The PUSCH is transmitted, and no PUCCH is transmitted.

In this case, some second parameters for determining the power of the PUCCH may be determined according to a first parameter used for the PUSCH.

Optionally, k and/or l corresponding to the PUCCH may be k and/or l corresponding to the PUSCH in a current time element Optionally, $P_o$ (b) corresponding to the PUCCH may be obtained based on j corresponding to the PUSCH in the current time element and a correspondence between j and b.

Optionally, $P_o$ (b) corresponding to the PUCCH may be obtained based on a transmission manner and/or transmission configuration information of j corresponding to the PUSCH in the current time element.

In this case, although the terminal device does not obtain information about the PUCCH, the terminal device may transmit the PUCCH by default according to a transmission characteristic assumption (a transmission manner and/or transmission configuration information) such as a beam for transmitting the PUSCH.

Case 2: No PUSCH is transmitted, and the PUCCH is transmitted.

Similar to case 1, in this case, some second parameters for determining the power of the PUSCH may be determined according to a first parameter used for the PUCCH.

Optionally, k and/or l corresponding to the PUSCH may be k and/or l corresponding to the PUCCH in a current time element.

Optionally, $P_o$ (j) corresponding to the PUSCH may be obtained based on b corresponding to the PUCCH in the current time element and a correspondence between j and b.

Optionally, $P_o$ (j) corresponding to the PUSCH may be obtained based on a transmission manner and/or transmission configuration information of b corresponding to the PUCCH in the current time element.

In this case, although the terminal device does not obtain information about the PUSCH, the terminal device may transmit the PUSCH by default according to a transmission characteristic assumption (a transmission manner and/or transmission configuration information) such as a beam for transmitting the PUCCH.

It may be understood that when the PUSCH or the PUCCH lacks any information, parameters used for calculating the PH correspond to a same transmission configuration.

Figure 3:
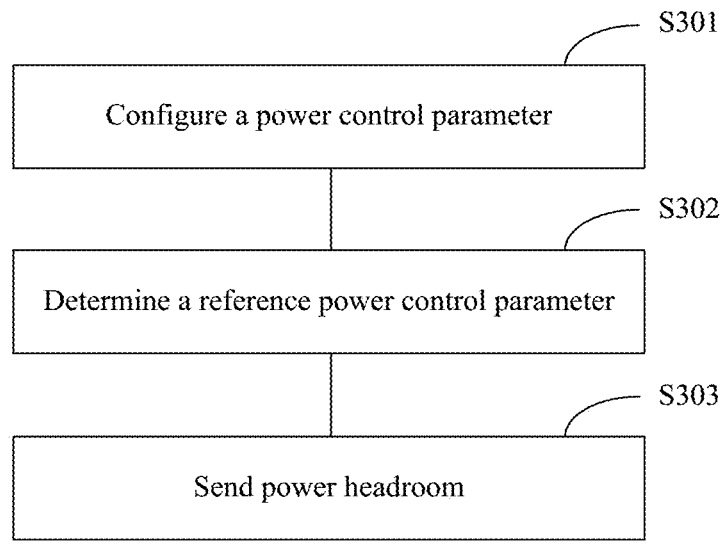
FIG. 3 is a schematic flowchart of a communication method according to an embodiment of this application.

As shown in FIG. 3, the following provides a possible method procedure of this application.

Step 301: Configure a power control parameter, that is, obtain a first parameter.

The first parameter may include:

(1) Maximum transmit power allowed by a network device: The network device may configure, for the terminal device, a maximum transmit power of the terminal device allowed by the network device. However, a maximum transmit power that is finally used to determine a transmit signal power is calculated by the terminal device based on a maximum transmit power that can be supported by the terminal device, the maximum transmit power configured by the network device, and the like. For example, the maximum transmit power configured by the terminal device should not exceed the maximum transmit power that can be supported by the terminal device, and cannot exceed the allowed maximum transmit power configured by the network device. The maximum transmit power configured by the network device for the terminal device may be a maximum transmit power that is assumed based on omni-directional transmit (TRP, Total Radiated Power) or directional transmit (EIRP, Effective Isotropic Radiated Power).

(2) $P_O$: The network device may configure at least one P0 value for the PUSCH and the PUCCH. A P0 value of an SRS may be the P0 value of the PUSCH, or may be configured separately for the SRS. The P0 value may include two parts: cell-level P0 and terminal device-level P0, or may include two parts: common P0 and P0 corresponding to a specific transmission characteristic. When the network device configures more than one P0 value for the terminal device, these P0 values may correspond to different transmission configurations.

The transmission configuration in this application is a general name of at least one transmission configuration. The at least one transmission configuration may be at least one of a transmission beam, a transmission waveform (such as CP-OFDM or DFT-S-OFDM), a transmission service (such as URLLC or eMBB), numerology, a bandwidth part BWP, a carrier, a time domain length, a slot set, and the like.

In this application, a beam may be identified by using a resource ID, a port number, a time domain identifier, a frequency domain identifier, a pattern identifier, a precoding matrix identifier, and the like of a signal.

(3) α: α is a path loss adjustment factor, which is generally used to adjust a path loss compensation degree, and can be used to suppress strong interference of a high transmit power of a center user. In a process of calculating a power or power headroom, a path loss factor is generally multiplied by a path loss to adjust a compensated path loss value. A value of α may be a positive number in a range of [0, 1], or may be a number greater than 1. Similar to P0, the network device may configure α plurality of a values, and each α value may correspond to a different transmission characteristic. α may also be denoted as alpha.

For the PUSCH, P0 and alpha, the network device configures respective P0 and alpha used for: (1) semi-static or grant free transmission; (2) msg3 transmission; and (3) grant-based transmission (that is, dynamic transmission).

A configuration method may be as follows: For the first two transmission manners, corresponding P0 and alpha are separately configured. For the third transmission manner, there may be corresponding J groups of P0 and alpha, where J≥1. The J groups of parameters do not include parameters corresponding to static or grant free transmission or msg3 transmission.

Alternatively, a configuration method is as follows: The network device configures J groups of parameters, where each group of parameters includes P0 and alpha, and J≥3. In this way, in the J groups of parameters, at least one group of parameters corresponds to semi-static or grant free transmission, at least one group of parameters corresponds to msg3 transmission, and at least one group of parameters corresponds to grant-based transmission.

For the foregoing two manners, the network device needs to notify a quantity (a quantity of groups) of power control parameters and each specific group of parameters. The network device configures at least one group of parameters for dynamic transmission, and the at least one group of parameters is a subset of the J groups of parameters. The at least one group of parameters corresponds to a specific transmission configuration. The terminal device may be notified of this correspondence in two manners. In one manner, when the ja group of parameters is configured, a relationship of a transmission characteristic corresponding to j is also configured, where 1≤j≤J. For example, at least one such group of parameters is configured in RRC:

```
UplinkPowerControl::=    SEQUENCE {
    j                    INTEGER (1...J)
    p0                   INTEGER (–126..24)
    alpha                ENUMERATED {al0, al04, al05, al06, al07, al08,
al09, al1}
    Property
}
```

A specific parameter value range in the example is not limited herein, and is merely an example. For example, an example configuration range of P0 herein is –126 to 24, and this value is not limited herein. In the example, P0, alpha, and a transmission configuration (the Property parameter in the signaling example) need to be configured. A transmission beam in the transmission configuration may be an uplink or downlink beam resource indication. Specifically, the transmission beam may be an SRS resource (such as an SRI), a CSI-RS resource (CRI), an SS block indicator (such as an SSB index or flag), or the like. j may be configured, or may not be configured. In a transmission process, the terminal device may learn of a current transmission configuration based on current scheduling information, so as to know which group of parameters is to be used. Therefore, a specific value of j may not be configured.

In the other manner, at least one such group of parameters is configured in RRC:

```
UplinkPowerControl::=    SEQUENCE {
    j                    INTEGER (1...J)
    p0                   INTEGER (–126..24)
    alpha                ENUMERATED {al0, al04, al05, al06, al07, al08,
al09, al1}
}
```

A specific parameter value range in the example is not limited herein, and is merely an example. In the example, P0, alpha, and j need to be configured, and a transmission configuration may not be configured. In this case, because the network device does not have an explicit correspondence between a parameter and a transmission configuration, the network device needs to indicate, to the terminal device, a power control parameter corresponding to which j is to be used. If the network device configures a transmission beam for the terminal device, j indicated by the network device is used by the terminal device to obtain a corresponding power control parameter, and the power control parameter corresponds to the current transmission beam.

(4) f: a closed-loop control message. A closed-loop power control parameter of the terminal device may be obtained by using closed-loop power control indication information in downlink control information. The closed-loop power control indication information includes adjustment signaling TPC of a closed-loop power control adjustment value. This application further provides a power control information indication method or a power control method. The method may be applied independently, or may be applied in combination with another embodiment of this application or another part of this embodiment. Specifically, the DCI may carry closed-loop power control information corresponding to at least one antenna port (at least one group of antenna ports) of at least one channel or signal on at least one carrier in at least one serving cell of at least one terminal device. The terminal device, the serving cell, the carrier, the channel, the signal, the antenna port, and the like may be indicated to the terminal device by using the network device, so that the terminal device knows the user, the serving cell, the carrier, the channel, the signal, and the antenna port that correspond to the TPC. For example, the network device may indicate identification information of the serving cell, the carrier, the channel, the signal, the antenna port, and the like, and the corresponding TPC to the terminal device. Specifically, if the network device may indicate a carrier number and TPC in DCI, the terminal device may know, according to the indicated carrier number and TPC, a carrier for which the indicated TPC is used. Alternatively, the network device may indicate carrier indication information and TPC in DCI, and the terminal device knows, according to a correspondence between the indication information and a specific carrier number, a carrier for which the TPC is used.

Alternatively, the terminal device may learn of the information in an implicit manner. For example, a piece of DCI may carry TPC information of a plurality of users (e.g., terminal devices), and a user (e.g., a terminal device) may obtain TPC information of the user based on RNTI scrambling information of the user. One RNTI of a user (e.g., a terminal device) may correspond to TPC of a plurality of carriers, and carrier information corresponding to each TPC may be carried in DCI; or a plurality of RNTIs of a user (e.g., a terminal device) may correspond to TPC information of a plurality of carriers. In this way, a user (e.g., a terminal device) may obtain one or more pieces of TPC information from one piece of DCI information.

A first power control (or power control information indication) method provided in this application may include the following steps:

S401. A terminal device receives downlink control information, where the downlink control information includes power control information of a channel or a signal.

S402. The terminal device determines, based on the downlink control information, the channel or the signal (that is, a channel or a signal for which power control is performed) that corresponds to the power control information included in the downlink control information.

Correspondingly, from a network device side, the method may include:

S401'. The network device sends the downlink control information, where the downlink control information includes the power control information of a channel or a signal.

There is a correspondence between the downlink control information and the channel or the signal corresponding to the power control information. In S402, the terminal device determines, based on the downlink control information and the correspondence between the downlink control information and the channel or the signal corresponding to the power control information, the channel or the signal corresponding to the power control information included in the downlink control information.

Optionally, the correspondence includes one or more of the following:

a correspondence between a format of the downlink control information and the channel or the signal corresponding to the power control information included in the downlink control information; or a correspondence between scrambling information of the downlink control information and the channel or the signal corresponding to the power control information included in the downlink control information.

This application further provides a second power control method (a multiplexing indication manner), and the method may include the following steps:

S403. A terminal device receives configuration information (which may also be referred to as indication information) from a network device, where the configuration information indicates that power control of a first channel or signal, such as an SRS, and power control of a second channel or signal, such as a PUSCH or a PUCCH, have an association (which may also be described as at least one (including one or more) of having a binding relationship, having a coupling relationship, or applying a same parameter).

S404. According to the configuration information, the terminal device obtains power control information of the first channel or signal, such as an SRS, based on power control information used for the second channel or signal, such as a PUSCH or a PUCCH, or obtains power control information of the second channel or signal, such as a PUSCH or a PUCCH, based on power control information used for the first channel or signal, such as an SRS.

The power control information may be power adjustment value information.

Correspondingly, from the network device side, the method may include the following steps:

S403'. The network device determines a relationship between the power control information of the second channel or signal, such as a PUSCH or a PUCCH, and the power control information of the first channel or signal, such as an SRS.

S404'. The network device sends the configuration information to the terminal device, where the configuration information indicates that power control of the first channel or signal, such as an SRS, and power control of the second channel or signal, such as a PUSCH or a PUCCH, have an association (which may also be described as at least one (including one or more) of having a binding relationship, having a coupling relationship, or applying a same parameter).

The power control information of the first channel or signal, such as an SRS, and the power control information of the second channel or signal, such as a PUSCH or a PUCCH, may have a correspondence or a mapping relationship, for example, a function relationship or a table correspondence.

Optionally, in S405, the terminal device applies the power control information of the second channel or signal, such as a PUSCH or a PUCCH, to perform power control on the second channel or signal, such as the PUSCH or the PUCCH, and/or applies the power control information of the second channel or signal, such as the PUSCH or the PUCCH, to perform power control on the first channel or signal, such as an SRS; or the terminal device applies the power control information of the first channel or signal, such as an SRS, to perform power control on the first channel or signal, such as the SRS, and/or applies the power control information of the first channel or signal, such as the SRS, to perform power control on the second channel or signal, such as a PUSCH or a PUCCH.

Optionally, the configuration information may be carried in higher layer signaling, such as radio resource control RRC signaling or a media access control control element MAC CE.

Optionally, the configuration information may also be carried in physical layer signaling, such as downlink control information.

Optionally, the association, indicated by the configuration information, between power control of the first channel or signal and power control of the second channel or signal may be that power control of a specific first channel or signal is associated with power control of the second channel or signal (or a specific second channel or signal). For example, an association, indicated by the configuration information, between power control of an SRS and power control of a PUSCH or a PUCCH may be that power control of a specific SRS resource and/or SRS resource group is associated with power control of the PUSCH or the PUCCH (or a specific PUSCH or PUCCH).

Optionally, the specific first channel or signal, such as the SRS resource and/or the SRS resource group, may be determined based on a protocol predefinition, for example, having a specific first channel or signal feature (such as an identifier or scrambling or a sequence), such as an SRS resource identifier and/or an SRS resource group identifier; or may be indicated by using signaling of the network device, for example, directly or indirectly indicating, by using higher layer signaling or physical layer signaling, a first channel or signal, such as an SRS resource and/or resource group whose power control is associated with power control of the second channel or signal, such as the PUSCH or the PUCCH.

The foregoing provided second power control method may be applied in combination with the first method, or may be applied independently.

This application further provides a third power control method, and the method may include the following steps:

S501. A terminal device receives downlink control information, where the downlink control information includes power control information of two or more channels or signals.

S502. The terminal device determines, based on the downlink control information, the channels or signals (that is, channels or signals for which power control is performed) corresponding to the power control information included in the downlink control information.

Correspondingly, from a network device side, the method may include:

S501'. The network device sends the downlink control information, where the downlink control information includes the power control information of two or more channels or signals.

That the downlink control information includes the power control information of two or more channels or signals is as follows:

the power control information used for different channels or signals (two or more channels or signals) in the downlink control information may be indicated in different fields or information elements in the downlink control information, or may be jointly indicated in a same field. Optionally, the joint indication may include indication by using different bits of a same signaling field, where a sequence of the bits may have a correspondence with a specific channel or signal. For example, most significant bits of the signaling field are used to indicate power control information of a channel or signal, for example, power control information of a PUSCH, and least significant bits of the signaling field are used to indicate power control information of another channel or signal, for example, power control information of an SRS.

Optionally, that the downlink control information includes the power control information of two or more channels or signals may be implemented in a multiplexing indication manner in the foregoing second method.

In this case, the second method may be used when multiplexing is performed, and the third method may be used when multiplexing is not performed. Whether multiplexing is performed may be specifically determined based on the configuration information in the second method. Details are not described herein again.

Optionally, when multiplexing is performed, values of power control information (power control information corresponding to channels or signals may not be distinguished, or power control information corresponding to specific channels or signals may be used, which is not limited herein) may be a first set, for example, a set {−1, 0, 1, 3} dB; when multiplexing is not performed, values of power control information (power control information corresponding to channels or signals may not be distinguished, or power control information corresponding to specific channels or signals may be used, which is not limited herein) may be a second set, for example, a set {−1, 1} dB, where the second set may be a subset of the first set. This can reduce signaling overheads.

With reference to at least one of the foregoing first method, second method, or third method, the following give specific examples by using an example in which power control information is closed-loop power control information. It may be understood that when power control information is non-closed-loop power control information, reference may also be made to descriptions in the following examples, and details are not described herein.

Optionally, that the DCI may carry closed-loop power control information of at least one channel or signal includes: The DCI carries closed-loop power control (TPC) information of one channel or signal, or the DCI carries closed-loop power control information of a plurality of channels or signals. In this application, "a plurality of" indicates two or more.

Optionally, that the DCI may carry closed-loop power control information of at least one channel or signal includes: The DCI carries closed-loop power control (TPC) information of one type of channel or signal, or the DCI carries closed-loop power control information of a plurality of types of channels or signals. In this application, "a plurality of types of" indicates two or more types.

Optionally, that the DCI carries closed-loop power control information of one channel or signal includes: The DCI carries closed-loop power control information of a specific channel or signal, where the specific channel or signal may be a PUSCH, a PUCCH, or an SRS. The terminal device receives the DCI, and may determine, according to a rule and/or indication information, a channel or a signal (that is, a channel or a signal for which power control or adjustment is performed) to which TPC information in the DCI corresponds.

Specifically, for example, the terminal device determines, based on a format of the DCI, a channel or a signal to which TPC information carried in the received DCI corresponds. In this case, there is a correspondence between the format of the DCI and the channel or the signal corresponding to the TPC information carried in the DCI. The terminal device determines, based on the format of the received DCI and the correspondence, the channel or the signal corresponding to the TPC information carried in the received DCI. For example, when the format of the DCI is a first format, TPC carried in the DCI corresponds to a PUSCH, where the first format may be a DCI format for scheduling a PUSCH; when the format of the DCI is a second format, TPC carried in the DCI corresponds to a PUCCH, where the second format may be a DCI format for scheduling a PDSCH (downlink data channel); and/or when the format of the DCI is a third format, TPC carried in the DCI corresponds to an SRS, where the third format may be a DCI format for scheduling an SRS. In addition, there may also be correspondences between other formats and a channel or a signal, and examples are not listed one by one.

Alternatively, for example, the terminal device determines, based on scrambling information of the DCI, a channel or a signal to which TPC information carried in the received DCI corresponds. In this case, there is a correspondence between the scrambling information of the DCI and the channel or the signal to which the TPC information carried in the DCI corresponds. The terminal device determines, based on the scrambling information of the received DCI and the correspondence, the channel or the signal corresponding to the TPC information carried in the received DCI. For example, optionally, when the scrambling information of the DCI is first scrambling information, TPC carried in the DCI corresponds to a PUSCH, where the first scrambling information may be an RNTI related to a PUSCH; and/or when the scrambling information of the DCI is second scrambling information, TPC carried in the DCI corresponds to a PUCCH, where the second scrambling information may be an RNTI related to a PUCCH. In addition, there may be a correspondence between other scrambling information and a channel and a signal. For example, the scrambling information may be scrambling information corresponding to an SRS, and examples are not listed one by one.

Alternatively, for example, the terminal device determines, based on SRS-related configuration information from the network device, a channel or a signal to which the TPC information carried in the received DCI corresponds. For example, when the configuration information received by the terminal device from the network device indicates that power control of an SRS and power control of a PUSCH meet at least one (including one or more) of the following conditions: having an association, having a binding relationship, having a coupling relationship, or applying a same parameter, closed-loop power control information corresponding to TPC obtained by the terminal device in the DCI corresponds to a closed-loop power control adjustment value of the PUSCH. A function of the closed-loop power control adjustment value corresponding to the closed-loop power control information may be further used for power control of the SRS. The function may be used to enable an output value to be equal to an input value, or enable an output value to be equal to linear transformation of an input value (e.g., a sum of the input value and a constant), or enable an output value and an input value to have a mapping relationship (e.g., learn, based on at least one of a table, a formula or a string, that a specific input value has a correspondence with a specific output value). When the configuration information received by the terminal device from the network device indicates that power control of the SRS and power control of the PUSCH have no association, or have no binding relationship, or have no coupling relationship, or apply parameters that are not completely the same, closed-loop power control information corresponding to TPC obtained by the terminal device in a piece of DCI corresponds to only a closed-loop power control adjustment value for controlling the PUSCH, and closed-loop power control information corresponding to TPC obtained by the terminal device in another piece of DCI corresponds to only a closed-loop power control adjustment value for controlling the SRS. The piece of DCI and the another piece of DCI may be distinguished by using DCI scrambling information, or may be distinguished in another manner, which is not limited herein.

The configuration information may be carried in higher layer signaling. For example, one or more items of indication information (referred to as a binding indication) used to indicate that power control of the SRS and power control of the PUSCH have an association, or have a binding relationship, or have a coupling relationship, or apply a same parameter, and/or one or more items of indication information (referred to as a non-binding indication) used to indicate that power control of the SRS and power control of the PUSCH have no association, or have no binding relationship, or have no coupling relationship, or apply parameters that are not completely the same are/is directly indicated in the configuration information. Alternatively, an enable/disable indication for the binding indication may be used to indicate binding or not binding, or an enable/disable indication for the non-binding indication may be used to indicate not binding or binding. For example, enabling the binding indication indicates binding, disabling the binding indication indicates not binding, enabling the non-binding indication indicates not binding, and disabling the non-binding indication indicates binding. Alternatively, binding or not binding may be indicated according to existence or validity of the binding indication or the non-binding indication. For example, if the binding indication exists, it indicates binding; if the binding indication does not exist, it indicates not binding; and so on. Details are not described. Alternatively, it may be determined in an implicit manner. For example, it is determined based on whether parameters configured by the network device such as nominal powers and path loss adjustment factors of the PUSCH and the SRS are the same. The method may be further extended to between an SRS and a PUCCH. Specifically, for example, when the terminal device receives, from the network device, information indicating that power control of the SRS and power control of the PUCCH have an association, or have a binding relationship, or have a coupling relationship, or apply a same parameter, closed-loop power control information corresponding to TPC obtained by the terminal device in the DCI corresponds to a closed-loop power control adjustment value of the PUCCH, and a function of the power control adjustment value corresponding to the closed-loop power control information may be further used for power control of the SRS.

Alternatively, for example, the terminal device determines, based on SRS-related indication information carried in the DCI, a channel or a signal to which the TPC information carried in the received DCI corresponds. The SRS-related indication information may be at least one of SRS resource indication information or SRS resource request information. The SRS resource indication information is information (usually an SRS resource or SRS resource group identifier or index or number) used to indicate one or more SRS resources and/or SRS resource groups. The SRS resource request information is sent by the network device to the terminal device, and is request information for requesting the terminal device to send an SRS. Further, a channel or a signal to which the TPC information carried in the received DCI corresponds may be determined based on an association relationship between an SRS resource or SRS resource group indicated by the SRS-related indication information and power control of the PUSCH. The association relationship may be predefined in a protocol, or may be explicitly or implicitly indicated by using signaling, such as higher layer signaling or physical layer signaling. The explicit indication means that the association relationship is directly indicated by using a field in the signaling, and the terminal device may directly determine the association relationship according to the signaling. The implicit indication means that the association relationship is directly indicated by using signaling, and the terminal device indirectly determines the association relationship according to the signaling and a known rule.

When the SRS resource and/or the SRS resource group (e.g., an SRS resource group to which the SRS resource belongs) corresponding to the SRS-related indication information and power control of the PUSCH have an association, and/or have a binding relationship, and/or have a coupling relationship, and/or apply a same parameter, closed-loop power control information corresponding to TPC obtained by the terminal device in the DCI corresponds to a closed-loop power control adjustment value of the PUSCH, and a function of the power control adjustment value corresponding to the closed-loop power control information may be further used for power control of the SRS. The function is described in the foregoing solution, and is not described again. When the SRS resource and/or the SRS resource group corresponding to the SRS-related indication information and power control of the PUSCH have no association, or have no binding relationship, or have no coupling relationship, or apply parameters that are not completely the same, closed-loop power control information corresponding to TPC obtained by the terminal device in a piece of DCI corresponds to only a closed-loop power control adjustment value of the SRS, and closed-loop power control information corresponding to TPC obtained in another piece of DCI corresponds to only a closed-loop power control adjustment value for controlling the PUSCH. The piece of DCI and the another piece of DCI may be distinguished by using DCI scrambling information, or may be distinguished in another manner, which is not limited herein.

Alternatively, for example, the terminal device determines, according to another rule, for example, a function of a time element corresponding to the terminal device, a channel or a signal to which TPC information carried in the received DCI corresponds. The function may be a linear or non-linear function of a time element, for example, a function of a time element modulo 2. For example, the terminal device determines, based on whether a current time element is an odd- or even-numbered time element, a channel or a signal to which TPC information carried in the received DCI corresponds. The current time element may be a time element for receiving the DCI, a time element scheduled for the DCI, or a time element for sending the channel or signal.

The foregoing manners may be used independently or together. For example, the terminal device determines, based on at least two of a format of the DCI, scrambling information of the DCI, SRS-related configuration information of the network device, SRS-related indication information carried in the DCI, and another rule such as a function of a time element, a channel or a signal to which the TPC information carried in the received DCI corresponds. Specifically, for example, the terminal device determines, based on both the scrambling information of the DCI and the indication information carried in the DCI, a channel or a signal to which the TPC in the DCI corresponds. For example, when the scrambling information is scrambling information related to the PUSCH, the terminal device further determines, based on whether the SRS-related indication information carried in the DCI meets the foregoing requirement, whether the closed-loop power control information carried in the DCI is used for power adjustment of only the PUSCH, or may be used for power adjustment of both the PUSCH and the SRS. When the scrambling information is scrambling information related to the SRS, the terminal device determines that the closed-loop power control information carried in the DCI is used for power adjustment of the SRS. In this application, that the closed-loop power control information or the closed-loop power control adjustment value corresponds to "A" means that the closed-loop power control information or the closed-loop power control adjustment value may be used for closed-loop power control or adjustment of A, where A may be at least one of a PUSCH, an SRS, or a PUCCH.

Optionally, that the DCI carries closed-loop power control information of a plurality of channels or signals may include: the DCI carries closed-loop power control information of a plurality of types of channels or signals, where the plurality of types of channels or signals may include two or more types of a PUSCH, a PUCCH, or an SRS. A quantity of channels or signals of each type is not limited herein. The terminal device receives the DCI, and may determine, by using a rule and/or indication information, a type of channel or signal to which one or more pieces of TPC information in the DCI corresponds. "A plurality of" means two or more.

Specifically, for example, the DCI may carry closed-loop power control information of a PUSCH and an SRS. The terminal device obtains, based on configuration information of the network device, the closed-loop power control information of the PUSCH and the SRS that is carried in the DCI.

For example, the DCI may carry closed-loop power control information of a PUSCH and an SRS. The terminal device obtains, based on indication information carried in the DCI, for example, based on SRS-related indication information carried in the DCI, the closed-loop power control information corresponding to the PUSCH and the SRS. The SRS-related indication information may be at least one of SRS resource indication information or SRS resource request information. The SRS resource indication information is information (usually an SRS resource or SRS resource group identifier or index or number) used to indicate one or more SRS resources and/or SRS resource groups. The SRS resource request information is sent by the network device to the terminal device, and is request information for requesting the terminal device to send an SRS. Further, how to interpret TPC information carried in the received DCI (that is, a type of channel or signal for which power control may be performed) may be determined based on an association relationship between an SRS resource or SRS resource group indicated by the SRS-related indication information and power control of the PUSCH. The association relationship may be predefined in a protocol, or may be explicitly or implicitly indicated by using signaling, such as higher layer signaling or physical layer signaling. The explicit indication means that the association relationship is directly indicated by using a field in the signaling, and the terminal device may directly determine the association relationship according to the signaling. The implicit indication means that the association relationship is indirectly indicated by using signaling, and the terminal device indirectly determines the association relationship according to the signaling and a known rule.

When the SRS resource and/or the SRS resource group corresponding to the SRS-related indication information and power control of the PUSCH have an association, and/or have a binding relationship, and/or have a coupling relationship, and/or apply a same parameter, closed-loop power control information corresponding to TPC obtained by the terminal device in the DCI corresponds to a closed-loop power control adjustment value of the PUSCH, and a function of the power control adjustment value corresponding to the closed-loop power control information may be further used for power control of the SRS. The function is described in the foregoing solution, and is not described again. When the SRS resource and/or the SRS resource group corresponding to the SRS-related indication information and power control of the PUSCH have no association, or have no binding relationship, or have no coupling relationship, or apply parameters that are not completely the same, the terminal device may obtain, in the DCI, closed-loop power control information used for the SRS and the PUSCH. The closed-loop power control information used for the SRS and the PUSCH may be separately indicated in different fields, or the closed-loop power control information used for the SRS and the PUSCH may be jointly indicated in a same field. A manner of joint indication includes indication by using different bits of a same signaling field, where a sequence of the bits may have a correspondence with the PUSCH or the SRS. For example, most significant bits of the signaling field are used to indicate the closed-loop power control information of the PUSCH, and least significant bits of the signaling field are used to indicate the closed-loop power control information of the SRS.

Further, to reduce signaling overheads, when the DCI carries the respective closed-loop power control information of the PUSCH and the SRS, a value range of the closed-loop power control information is smaller. For example, when the closed-loop power control information carried in the DCI may be used for the PUSCH, or the PUSCH and the SRS (that is, a closed-loop power control adjustment value of the SRS is a function of a closed-loop power control adjustment value of the PUSCH), a value corresponding to the closed-loop power control information may be a first set, for example, a set {−1, 0, 1, 3} dB; when the closed-loop power control information carried in the DCI is used for determining the closed-loop power control adjustment values of the PUSCH and the SRS, a value corresponding to the closed-loop power control information may be a second set, for example, a set {−1, 1} dB. Optionally, the second set may be a subset of the first set.

The foregoing description is provided by using an example in which an indication or configuration information included in higher layer signaling (such as RRC or MAC CE signaling) or physical layer signaling (such as DCI) is SRS-related information and TPC information used for PUSCH power control may be used for SRS power control. It may be understood that when the solution is that an indication or configuration information included in higher layer signaling (such as RRC or MAC CE signaling) or physical layer signaling (such as DCI) is SRS-related information and TPC information used for SRS power control may be used for PUSCH power control, or that an indication or configuration information included in higher layer signaling (such as RRC or MAC CE signaling) or physical layer signaling (such as DCI) is PUSCH-related information and TPC information used for SRS power control may be used for PUSCH power control, or that an indication or configuration information included in higher layer signaling (such as RRC or MAC CE signaling) or physical layer signaling (such as DCI) is PUSCH-related information and TPC information used for PUSCH power control may be used for SRS power control, the solution in the foregoing example may also be correspondingly expanded or deformed. Details are not described herein. In addition, in this application, that TPC information used for power control of B (e.g., an SRS) may be used for power control of C (e.g., a PUSCH) may be that TPC information used for power control of B may be directly used for power control of C, or may be that TPC information used for power control of B may be used for power control of C after transformation is performed by using a specific correspondence (e.g., a function relationship or a table correspondence). Details are not described herein.

Specifically, for example, when an SRS resource or an SRS resource group indicated by the SRS resource request information in the DCI is configured as having an association, or having a binding relationship, or having a coupling relationship with power control of the PUSCH, the terminal device may consider that TPC carried in the DCI is used for both closed-loop power control of the PUSCH and closed-loop power control of the SRS. A specific correspondence between TPC and closed-loop power control information of the PUSCH and/or the SRS meets one or more items of the following table:

| TPC | Closed-loop power control information used for the PUSCH | Closed-loop power control information used for the SRS |
| --- | --- | --- |
| First indicator value | First value, such as −1 db | Fifth value, such as −1 db |
| Second indicator value | Second value, such as −1 db | Sixth value, such as 1 db |
| Third indicator value | Third value, such as 1 db | Seventh value, such as −1 db |
| Fourth indicator value | Fourth value, such as 1 db | Eighth value, such as 1 db |

The first indicator value, the second indicator value, and the like respectively refer to indication bit information of the TPC. For example, the first indicator value is 00, the second indicator value is 01, the third indicator value is 10, and the fourth indicator value is 11. Based on the foregoing correspondence, the terminal device obtains a mapping relationship between indicator values of the TPC signaling and closed-loop power control information of the PUSCH and the SRS. In addition to a table form, the foregoing correspondence may also be represented or stored in a formula or string form.

(5) Measurement resource indication for measuring a PL: The network device needs to indicate a quantity of measurement resources (which may also be a quantity of PLs that need to be maintained by the terminal device, a quantity of PLs/RSRPs that need to be measured by the terminal device, or the like information that expresses this meaning) and a plurality of specific measurement resources. The measurement resource indication is used to enable the terminal device to obtain a corresponding measurement resource, so that the terminal device measures the measurement resource to obtain a loss experienced by the signal during transmission, enabling the terminal device to perform power compensation when sending the signal, to resist a loss during transmission.

In this application, there may be some additional writing forms such as a subscript, a superscript, and a definition field, which are collectively referred to as identifiers. Generally, this may be interpreted as follows:

An identifier PUSCH indicates that this parameter is used for a PUSCH.

An identifier PUCCH indicates that this parameter is used for a PUCCH.

An identifier SRS indicates that this parameter is used for an SRS.

An identifier i indicates that this parameter corresponds to a time element i, where the time element may be a slot, a mini slot, a subframe, a frame, a symbol, or the like.

An identifier c indicates that this parameter corresponds to a serving cell c, or a carrier component c, or is used for a transmission point c (e.g., DMRS group 1 is a transmission point 1, and DMRS group 2 is a transmission point 2, which may be learned by using different QCL indications).

Identifiers j and b are generally used to indicate transmission configurations, properties, uses, and the like corresponding to this parameter.

An identifier k is generally used to represent an association with at least one uplink beam resource k, a downlink measurement resource, or the like.

An identifier l indicates a loop number of a closed-loop parameter.

An identifier F indicates a format of a PUCCH.

Step S302: Obtain information about a reference power control parameter, that is, determine a second parameter used in the time element i.

When the first time element is not used to transmit at least one of a PUSCH, a PUCCH, or an SRS, how the terminal device determines the power control parameter to calculate a power and power headroom. This parameter is referred to as the reference power control parameter (also referred to as the second parameter).

For description of this part, refer to the description in the method shown in FIG. 2. Details are not described herein again.

Step S303: Transmit the power headroom.

The terminal device transmits the calculated power headroom to a MAC layer.

The terminal device triggers PH reporting after a trigger condition is met. The trigger condition may include that a path loss change exceeds a threshold. The threshold may be specific to one or more carriers in one or more serving cells.

In addition to the PH value, the terminal device may further send information about a maximum transmit power, parameter information selected by the terminal device, and the like to the network device.

The power determining method in this application may also be applied to a transmit power. After the power is determined, the terminal device may need to send signals on a plurality of carrier components in a plurality of serving cells. In this case, a total power of the plurality of carrier components and serving cells may exceed a total transmit power of the terminal device. Therefore, the determined power further needs to be adjusted, so that the total power does not exceed the maximum transmit power. The adjustment may be performed based on a criterion of not exceeding the total transmit power of the terminal device, or not exceeding a total transmit power of each serving cell (set) of the terminal device, or based on a total transmit power of each carrier component (set) of the terminal device. Specifically, during adjustment, powers of the signals on different carrier components in different serving cells may be uniformly scaled up or down, or separately scaled up or down by multiplying by a scale factor, or processed in a specific sequence, so as to ensure that a power on a carrier component with a higher priority, a power in a serving cell with a higher priority, or a power of a specific channel or signal is preferentially allocated.

It may be understood that the descriptions in FIG. 2 and FIG. 3 may be independently applied, combined, or referenced.

The foregoing describes in detail the communication method in the embodiments of this application with reference to FIG. 2 and FIG. 3. The following describes in detail a communications apparatus in the embodiments of this application with reference to FIG. 4 to FIG. 6.

Figure 4:
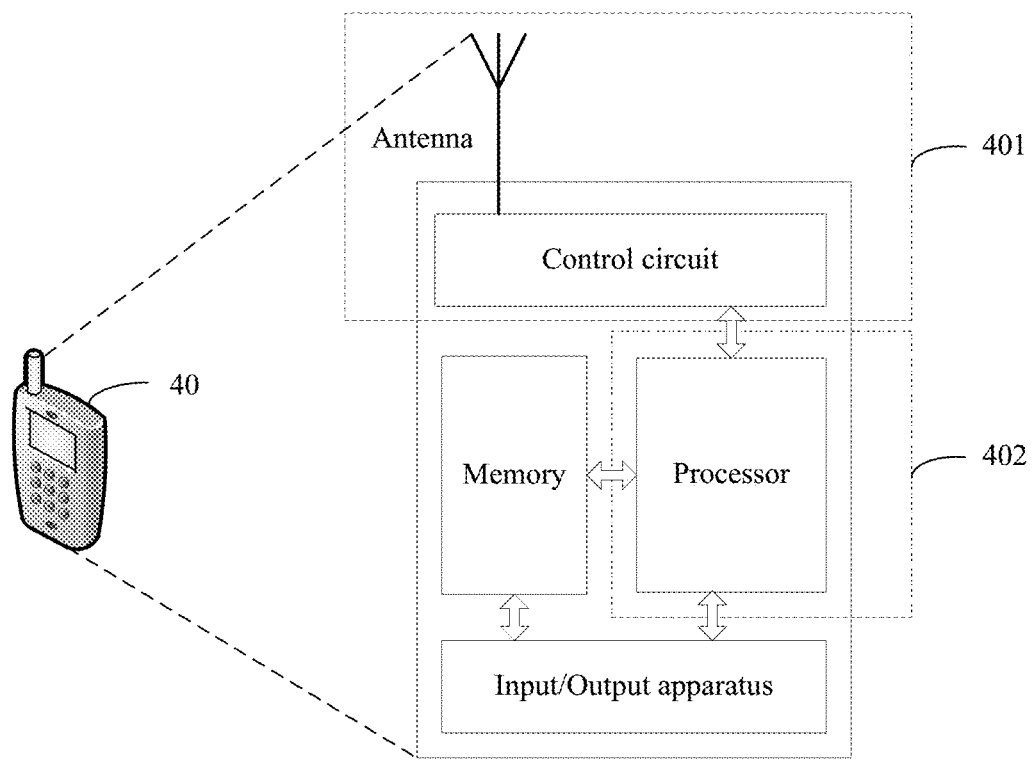
FIG. 4 is a schematic diagram of a terminal device according to an embodiment of this application.

FIG. 4 is a schematic structural diagram of a terminal device according to an embodiment of this application. The terminal device is applicable to the system shown in FIG. 1, and performs a function of the terminal device in the foregoing method embodiment. For ease of description, FIG. 4 shows only main components of the terminal device. As shown in FIG. 4, the terminal device 40 includes a processor, a memory, a control circuit, an antenna, and an input/output apparatus. The processor is mainly configured to process a communication protocol and communication data, control the entire terminal device, execute a software program, and process data of the software program. For example, the processor is configured to support the terminal device in performing an action described in the foregoing method embodiment, for example, determining a precoding matrix based on a received PMI and RI, so as to precode a signal and send a precoded signal. The memory is mainly configured to store a software program and data, for example, store a correspondence, between indication information and combination information, described in the foregoing embodiment. The control circuit is mainly configured to convert a baseband signal and a radio frequency signal and process a radio frequency signal. The control circuit, together with the antenna, may also be referred to as a transceiver that is mainly configured to receive/send a radio frequency signal in an electromagnetic wave form. The input/output apparatus, such as a touchscreen, a display screen, or a keyboard, is mainly configured to: receive data entered by a user and output data to the user.

After the terminal device is powered on, the processor may read a software program in a storage unit, interpret and execute an instruction of the software program, and process data of the software program. When data needs to be sent in a wireless manner, the processor performs baseband processing on the to-be-sent data, and outputs a baseband signal to a radio frequency circuit. The radio frequency circuit performs radio frequency processing on the baseband signal, and then sends a radio frequency signal by using the antenna in an electromagnetic wave form. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that for ease of description, FIG. 4 shows only one memory and only one processor. An actual terminal device may have a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data, and the central processing unit is mainly configured to control the entire terminal device, execute a software program, and process data of the software program. Functions of the baseband processor and the central processing unit may be integrated into the processor in FIG. 4. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing a communication protocol and communication data may be built into the processor; or may be stored in a storage unit in a form of a software program, so that the processor executes the software program to implement a baseband processing function.

In this embodiment of this application, the antenna that has a transceiver function and the control circuit may be considered as a transceiver unit 401 of the terminal device 40. For example, the transceiver unit 401 is configured to support the terminal device in performing the receiving function and the sending function described in FIG. 2. The processor that has a processing function is considered as a processing unit 402 of the terminal device 40. As shown in FIG. 4, the terminal device 40 includes the transceiver unit 401 and the processing unit 402. The transceiver unit may also be referred to as a transceiver machine, a transceiver, a transceiver apparatus, or the like. Optionally, a device, in the transceiver unit 401, that is configured to implement a receiving function may be considered as a receiving unit, and a device, in the transceiver unit 401, that is configured to implement a sending function may be considered as a sending unit. In other words, the transceiver unit 401 includes the receiving unit and the sending unit. The receiving unit may also be referred to as a receiver, an input port, a receiver circuit, or the like, and the sending unit may be referred to as a transmitter, a transmitter, a transmitter circuit, or the like.

The processor unit 402 may be configured to execute an instruction stored in the memory, to control the transceiver unit 401 to receive a signal and/or send a signal, so as to complete a function of the terminal device in the foregoing method embodiment. In an implementation, a function of the transceiver unit 401 may be implemented by using a transceiver circuit or a dedicated transceiver chip.

Figure 5:
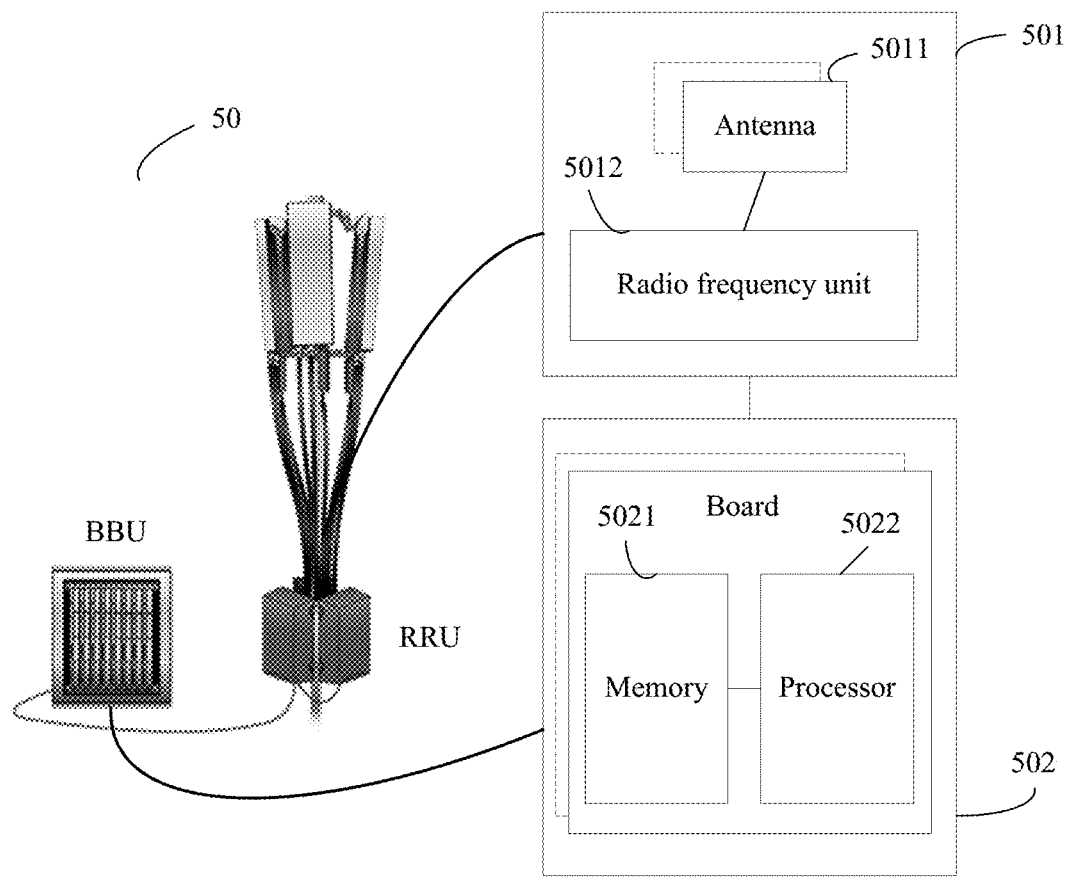
FIG. 5 is a schematic structural diagram of a network device according to an embodiment of this application.

FIG. 5 is a schematic structural diagram of a network device according to an embodiment of this application, for example, may be a schematic structural diagram of a base station. As shown in FIG. 5, the base station may be applied to the system shown in FIG. 1, and implement a function of the network device in the foregoing method embodiment. The base station 50 may include one or more radio frequency units such as remote radio units (remote radio unit, RRU) 501 and one or more baseband units (baseband unit, BBU) (which may also be referred to as digital units (digital unit, DU)) 502. The RRU 501 may be referred to as a transceiver unit, a transceiver, a transceiver circuit, a transceiver, or the like, and may include at least one antenna 5011 and a radio frequency unit 5012. The RRU 501 is mainly configured to receive/send a radio frequency signal and perform conversion between a radio frequency signal and a baseband signal, for example, configured to send the signaling message in the foregoing embodiments to a terminal device. The BBU 502 is mainly configured to perform baseband processing, control the base station, and the like. The RRU 501 and the BBU 502 may be physically disposed together; or may be physically disposed separately, to be specific, may be on a distributed base station.

The BBU 502 is a control center of the base station, may also be referred to as a processing unit, and is mainly configured to implement a baseband processing function, for example, channel coding, multiplexing, modulation, and spreading. For example, the BBU (the processing unit) 502 may be configured to control the base station to perform an operation procedure related to the network device in the foregoing method embodiment.

In an example, the BBU 502 may include one or more boards, and a plurality of boards may jointly support a radio access network (e.g., an LTE network) of a single access technology, or may separately support radio access networks (such as an LTE network, a 5G network, or another network) of different access standards. The BBU 502 further includes a memory 5021 and a processor 5022, where the memory 5021 is configured to store necessary instructions and data. For example, the memory 5021 stores the correspondence between a codebook index and a precoding matrix in the foregoing embodiment. The processor 5022 is configured to control the base station to perform a necessary action. For example, the processor 5022 is configured to control the base station to perform the operation procedure related to the network device in the foregoing method embodiment. The memory 5021 and the processor 5022 may serve one or more boards. In other words, a memory and a processor may be separately disposed on each board, or a plurality of boards may share a same memory and a same processor. In addition, a necessary circuit may be further disposed on each board.

Figure 6:
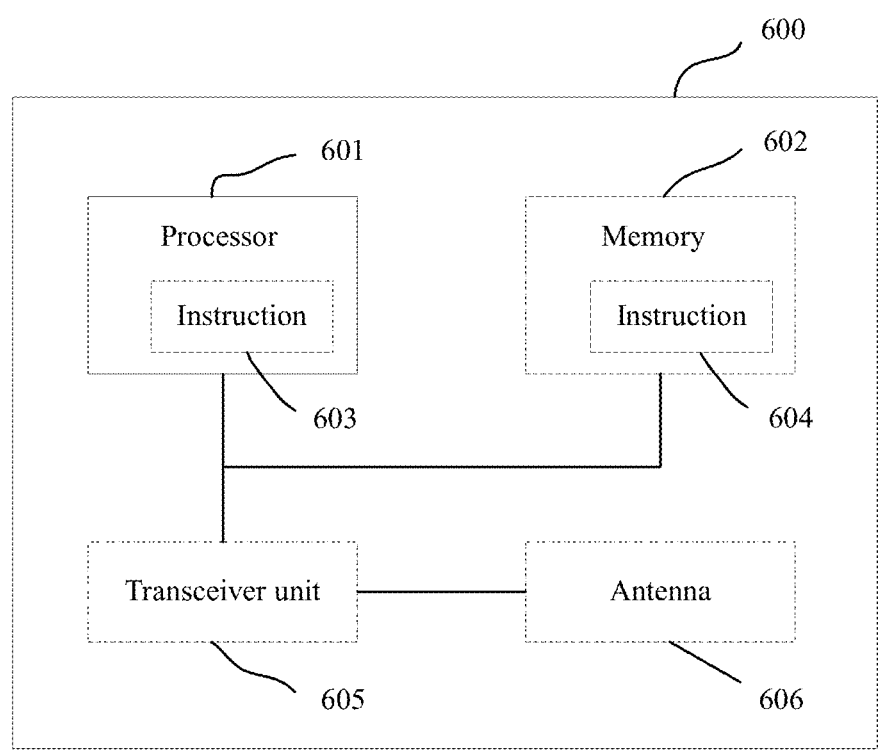
FIG. 6 is a schematic structural diagram of a communications apparatus according to an embodiment of this application.

FIG. 6 is a schematic structural diagram of a communications apparatus 600. The apparatus 600 may be configured to implement the method described in the foregoing method embodiment. For details, refer to description in the foregoing method embodiment. The communications apparatus 600 may be a chip, a network device (e.g., a base station), a terminal device, another network device, or the like.

The communications apparatus 600 includes one or more processors 601. The processor 601 may be a general purpose processor, a dedicated processor, or the like. For example, the processor 601 may be a baseband processor or a central processing unit. The baseband processor may be configured to process a communication protocol and communication data. The central processing unit may be configured to: control the communications apparatus (such as a base station, a terminal, or a chip), execute a software program, and process data of the software program. The communications apparatus may include a transceiver unit, configured to implement input (receiving) and output (sending) of a signal. For example, the communications apparatus may be a chip, and the transceiver unit may be an input and/or output circuit or a communications interface of the chip. The chip may be used by a terminal, a base station, or another network device. For another example, the communications apparatus may be a terminal, a base station, or another network device, and the transceiver unit may be a transceiver or a radio frequency chip.

The communications apparatus 600 includes one or more processors 601, and the one or more processors 601 may implement the method performed by the network device or the terminal device in the embodiment shown in FIG. 2.

In a possible design, the communications apparatus 600 includes a means (means) for generating first indication information and a means (means) for sending the first indication information. One or more processors may be used to implement functions of the means for generating the first indication information and the means for sending the first indication information. For example, the first indication information may be generated by using one or more processors, and sent by using a transceiver, an input/output circuit, or an interface of a chip. For the first indication information, refer to related descriptions in the foregoing method embodiments.

In a possible design, the communications apparatus 600 includes a means (means) for receiving first indication information and a means (means) for determining a second parameter. For the first indication information and a method for determining the second parameter, refer to related descriptions in the foregoing method embodiments. For example, the first indication information may be received by using a transceiver, an input/output circuit, or an interface of a chip, and the second parameter is determined by using one or more processors.

Optionally, the processor 601 may further implement another function in addition to the method in the embodiment shown in FIG. 2.

Optionally, in a design, the processor 601 may further include an instruction 603. The instruction may be run on the processor, so that the communications apparatus 600 performs the method described in the foregoing method embodiment.

In another possible design, the communications apparatus 600 may include a circuit. The circuit may implement the function of the network device or the terminal device in the foregoing method embodiment.

In still another possible design, the communications apparatus 600 may include one or more memories 602. The one or more memories 600 store an instruction 604. The instruction may be run on the processor, so that the communications apparatus 600 performs the method described in the foregoing method embodiment. Optionally, the memory may further store data. Optionally, the processor may further store an instruction and/or data. For example, the one or more memories 602 may store the correspondence described in the foregoing embodiment, or a related parameter, table, or the like in the foregoing embodiment. The processor and the memory may be separately disposed, or may be integrated together.

In yet another possible design, the communications apparatus 600 may further include a transceiver unit 605 and an antenna 606. The processor 601 may be referred to as a processing unit, and control the communications apparatus (a terminal or a base station). The transceiver unit 605 may be referred to as a transceiver, a transceiver circuit, a transceiver, or the like, and is configured to implement a transceiver function of the communications apparatus by using the antenna 606.

This application further provides a communications system, including the foregoing one or more network devices and one or more terminal devices.

It should be understood that, the processor in the embodiments of this application may be a central processing unit (CPU), or may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through illustrative rather than limitative description, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by using software, hardware (e.g., a circuit), firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on the computer, the procedure or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless (e.g., infrared, radio, microwave, or the like) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a DVD), or a semiconductor medium. The semiconductor medium may be a solid-state drive.

The term "and/or" in this specification describes only an association relationship for describing associated objects and represents that three relationships may exist. For example, A and/or B may represent the following three cases: Only A exists, both A and B exist, and only B exists. In addition, the character "/" in this specification is usually a simplified form of "and/or".

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving configuration information, wherein the configuration information comprises at least two values of a first parameter relating to power control of an uplink data channel, and wherein the configuration information comprises at least two first indexes (k) each of which corresponds to each of the at least two values of the first parameter, wherein the first parameter comprises an identity of a resource of a reference signal used for path loss measurement; and
determining a power headroom in a first time element based on a predefined first index;
wherein the first time element is not used to transmit an uplink data channel, and
wherein the predefined first index is one of the at least two first indexes.

2. The method according to claim 1, wherein the configuration information is carried in higher layer signaling.

3. The method according to claim 1, wherein the configuration information further comprises at least two value sets of a second parameter and at least two second indexes (j) each of which corresponds to each of the at least two value sets of the second parameter, the second parameter comprising a first group of open-loop parameter which comprises at least one of:
a nominal power ($P_O$), or
a path loss adjustment factor ($\alpha$);
wherein the determination of the power headroom is further based on a predefined second index and the predefined second index is one of the at least two second indexes.

4. The method according to claim 1, wherein the reference signal comprises channel state information-reference signal (CSI-RS), or, a synchronization signal block (SSB).

5. The method according to claim 1, wherein the configuration information further comprises at least two index values of a closed-loop power control process index (l) of a third parameter, the third parameter comprising a closed-loop power control adjustment value; and
wherein the determination of the power headroom is further based on a predefined index vallue of the closed-loop power control process index (l) of the third parameter and the predefined index value is one of the at least two index values.

6. The method according to claim 5, further comprising:
receiving a downlink control information comprising an adjustment signaling of the closed-loop power control adjustment value corresponding to at least one of the following:
at least one terminal device,
at least one serving cell,
at least one carrier,
at least one channel,
at least one signal, or
at least one antenna port; and
wherein the downlink control information further indicates a carrier corresponding to the adjustment signaling of the closed-loop power control adjustment value.

7. The method according to claim 5, wherein the closed-loop power control adjustment value is a dynamic power offset indicated by a transmission power control (TPC) command.

8. The method according to claim 1, wherein the predefined first index corresponds to a predefined carrier.

9. The method according to claim 1, wherein the at least two sets values of the first parameter correspond to a same serving cell.

10. A communications apparatus, comprising:
a memory, configured to store a computer program; and
a processor, configured to execute the computer program stored in the memory, cause the apparatus perform the following steps:
receiving configuration information, wherein the configuration information comprises at least two values of a first parameter relating to power control of an uplink data channel and the configuration information comprises at least two first indexes (k) each of which corresponds to each of the at least two values of the first parameter, wherein the first parameter comprises an identity of a resource of a reference signal used for path loss measurement; and
determining a power headroom in a first time element based on a predefined first index; wherein the first time element is not used to transmit an uplink data channel, and the predefined first index is one of the at least two first indexes.

11. The apparatus according to claim 10, wherein the configuration information is carried in higher layer signaling.

12. The apparatus according to claim 10, wherein the configuration information further comprises at least two value sets of a second parameter and at least two second indexes (j) each of which corresponds to each of the at least two value sets of the second parameter, the second parameter comprising a first group of open-loop parameters, which comprises at least one of: a nominal power ($P_O$) or a path loss adjustment factor ($\alpha$);
wherein the determination of the power headroom is further based on a predefined second index and the predefined second index is one of the at least two second indexes.

13. The apparatus according to claim 10, wherein the configuration information further comprises at least two index values of a closed-loop power control process index (l) of a third parameter, the third parameter comprising a closed-loop power control adjustment value; and
wherein the determination of the power headroom is further based on a predefined index value of the closed-loop power control process index (l) of the third parameter and the predefined index value is one of the at least two index values.

14. The apparatus according to claim 13, wherein the closed-loop power control adjustment value is a dynamic power offset indicated by a transmission power control (TPC) command.

15. The apparatus according to claim 14, wherein the processor is further configured to execute the computer program stored in the memory to cause the apparatus perform the following steps:
sending downlink control information, wherein the downlink control information comprises the TPC command corresponding to a carrier, and the downlink control information further comprises information indicating the carrier corresponding to the TPC command.

16. The apparatus according to claim 10, wherein the predefined first index corresponds to a predefined carrier.

17. The apparatus according to claim 10, wherein the at least two values of the first parameter correspond to a same serving cell.

18. The apparatus according to claim 10, wherein the reference signal comprises channel state information-reference signal (CSI-RS), or, a synchronization signal block (SSB).

19. A non-transitory readable storage medium, comprising a program or an instruction, which, when the program or the instruction is run by a processor, causes an apparatus including the processor perform the following:
receiving configuration information, wherein the configuration information comprises at least two values of a first parameter relating to power control of an uplink data channel and the configuration information comprises at least two first indexes (k) each of which corresponds to each of the at least two values of the first parameter, wherein the first parameter comprises an identity of a resource of a reference signal used for path loss measurement; and
determining a power headroom in a first time element based on a predefined first index;
wherein the first time element is not used to transmit an uplink data channel, and
wherein the predefined first index is one of the at least two first indexes.

20. A communication method, comprising:
sending configuration information, wherein the configuration information comprises at least two values of a first parameter and at least two first indexes (k) each of which corresponds to each of the at least two values of the first parameter, and the first parameter is used for determining an uplink data channel power during dynamic scheduling and the first parameter comprises an identity of a resource of a reference signal used for path loss measurement,
receiving a power headroom report, wherein the power headroom report is a virtual power headroom report, the virtual power headroom report is related to a value of the first parameter corresponding to a predefined first index, and the predefined index is one of the at least two first indexes (k), and
determining power headroom based on the power headroom report.

21. The method according to claim 20, wherein the reference signal comprises a channel state information reference signal (CSI-RS) or, a synchronization signal block (SSB).

22. The method according to claim 20, wherein the configuration information further comprises at least two value sets of a second parameter and at least two second indexes (j) each of which corresponds to each of the at least two value sets of the second parameter, the second parameter comprising a nominal power ($P_O$) and/or a path loss adjustment factor ($\alpha$), and the virtual power headroom report is further related to a predefined second index and the predefined second index is one of the at least two second indexes (j).

23. The method according to claim 20, wherein the configuration information further comprises at least two index values of a closed-loop power control process index (l) of a third parameter, the third parameter comprises at least one of a closed-loop power control adjustment value of a data channel, a closed-loop power control adjustment value of a reference signal, and a closed-loop power control adjustment value of a control channel, and the virtual power headroom report is further related to a predefined index value of the closed-loop power control process index (l) of the third parameter and the predefined index value is one of the at least two index values.

24. The method according to claim 23, wherein the closed-loop power control adjustment value is a dynamic power offset indicated by a transmission power control (TPC) command.

25. The method according to claim 24, wherein the processor is further configured to execute the computer program stored in the memory to cause the apparatus perform the following steps:
sending downlink control information, wherein the downlink control information comprises the TPC command corresponding to a carrier, and the downlink control information further comprises information indicating the carrier corresponding to the TPC command.

26. The method according to claim 20, wherein the configuration information is carried in higher layer signaling.

27. The method according to claim 20, wherein the at least two values of the first parameter correspond to a same serving cell.

28. The method according to claim 20, wherein the predefined first index corresponds to a predefined carrier.

29. A communications apparatus, comprising:
a memory, configured to store a computer program, and
a processor, configured to execute the computer program stored in the memory, cause the apparatus perform the following steps:
sending configuration information, wherein the configuration information comprises at least two values of a first parameter and at least two first indexes (k) each of which corresponds to each of the at least two values of the first parameter, and the first parameter is used for determining an uplink data channel power during dynamic scheduling and the first parameter comprises an identity of a resource of a reference signal used for path loss measurement,
receiving a power headroom report, wherein the power headroom report is a virtual power headroom report, the virtual power headroom report is related to a value of the first parameter corresponding to a predefined first index, and the predefined index is one of the at least two first indexes (k), and
determining power headroom based on the power headroom report.

30. The apparatus according to claim 29, wherein the reference signal comprises a channel state information reference signal (CSI-RS), or, a synchronization signal block (SSB).

31. The apparatus according to claim 29, wherein the configuration information further comprises at least two value sets of a second parameter and at least two second indexes (j) each of which corresponds to each of the at least two value sets of the second parameter, the second parameter comprising a nominal power ($P_O$) and/or a path loss adjustment factor ($\alpha$), and the virtual power headroom report is further related to a predefined second index and the predefined second index is one of the at least two second indexes (j).

32. The apparatus according to claim 29, wherein the configuration information further comprises at least two index values of a closed-loop power control process index (l) of a third parameter, the third parameter comprises at least one of a closed-loop power control adjustment value of a data channel, a closed-loop power control adjustment value of a reference signal, and a closed-loop power control adjustment value of a control channel, and the virtual power headroom report is further related to a predefined index value of the closed-loop power control process index (l) of the third parameter and the predefined index value is one of the at least two index values.

33. The apparatus according to claim 32, wherein the closed-loop power control adjustment value is a dynamic power offset indicated by a transmission power control (TPC) command.

34. The apparatus according to claim 33, further comprising:
sending downlink control information, wherein the downlink control information comprises the TPC command corresponding to a carrier, and the downlink control information further comprises information indicating the carrier corresponding to the TPC command.

35. The apparatus according to claim 29, wherein the configuration information is carried in higher layer signaling.

36. The apparatus according to claim 29, wherein the at least two values of the first parameter correspond to a same serving cell.

37. The apparatus according to claim 29, wherein the predefined first index corresponds to a predefined carrier.

* * * * *

UNITED STATES PATENT AND TRADEMARK OFFICE
CERTIFICATE OF CORRECTION

PATENT NO. : 11,516,754 B2
APPLICATION NO. : 16/765123
DATED : November 29, 2022
INVENTOR(S) : Ji et al.

It is certified that error appears in the above-identified patent and that said Letters Patent is hereby corrected as shown below:

On the Title Page

Page 2: Other Publications, Right-Hand Column, Line 12: "3rd Generation Partnership Project, Valbonne, France (December 2017)." should read -- 3rd Generation Partnership Project, Valbonne, France (October 2017). --.

In the Claims

Claim 3: Column 61, Line 27: "prising a first group of open-loop parameter which com-" should read -- prising a first group of open-loop parameters which com- --.

Claim 5: Column 61, Line 44: "further based on a predefined index vallue of the" should read -- further based on a predefined index value of the --.

Claim 9: Column 62, Line 2: "two sets values of the first parameter correspond to a same" should read -- two values of the first parameter correspond to a same --.

Claim 15: Column 62, Line 60: "corresponding to a carrier, and the downlink control" should read -- corresponding to a carrier; and the downlink control --.

Claim 19: Column 63, Line 19: "based on a predefined first index;" should read -- based on a predefined first index, --.

Claim 20: Column 63, Line 33: "path loss measurement," should read -- path loss measurement; --.

Claim 20: Column 63, Line 39: "first indexes (k), and" should read -- first indexes (k); and --.

Claim 22: Column 63, Line 52: "ment factor (a), and the virtual power headroom report is" should read -- ment factor (a); and the virtual power headroom report is --.

Signed and Sealed this
Twenty-fifth Day of April, 2023

Katherine Kelly Vidal
*Director of the United States Patent and Trademark Office*

Claim 25: Column 64, Line 11: "corresponding to a carrier, and the downlink control" should read -- corresponding to a carrier; and the downlink control --.

Claim 29: Column 64, Line 24: "a memory, configured to store a computer program, and" should read -- a memory, configured to store a computer program; and --.

Claim 29: Column 64, Line 36: "path loss measurement," should read -- path loss measurement; --.

Claim 29: Column 64, Line 42: "first indexes (k), and" should read -- first indexes (k); and --.

Claim 31: Column 64, Line 55: "ment factor (a), and the virtual power headroom report is" should read -- ment factor (a); and the virtual power headroom report is --.

Claim 34: Column 65, Line 12: "corresponding to a carrier, and the downlink control" should read -- corresponding to a carrier; and the downlink control --.